(12) United States Patent
Savery et al.

(10) Patent No.: US 7,637,319 B2
(45) Date of Patent: *Dec. 29, 2009

(54) KICKOFF PLUGS COMPRISING A SELF-DEGRADING CEMENT IN SUBTERRANEAN WELL BORES

(75) Inventors: Mark R. Savery, Duncan, OK (US); Ashok K. Santra, Duncan, OK (US); Bradley L. Todd, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 468 days.

This patent is subject to a terminal disclaimer.

(21) Appl. No.: 11/188,262

(22) Filed: Jul. 22, 2005

(65) Prior Publication Data

US 2006/0169453 A1 Aug. 3, 2006

Related U.S. Application Data

(63) Continuation-in-part of application No. 11/048,272, filed on Feb. 1, 2005, and a continuation-in-part of application No. 11/048,591, filed on Feb. 1, 2005.

(51) Int. Cl.
*E21B 33/13* (2006.01)
(52) U.S. Cl. .................................. 166/292; 166/117.5
(58) Field of Classification Search ................. 166/292, 166/117.5, 177.4; 175/61, 80
See application file for complete search history.

(56) References Cited

U.S. PATENT DOCUMENTS

| | | | |
|---|---|---|---|
| 2,238,671 A | 4/1941 | Woodhouse | .................. 166/21 |
| 2,288,557 A | 6/1942 | Vollmer | |
| 2,703,316 A | 3/1955 | Schneider | |
| 3,044,547 A | 7/1962 | Jarboe, Jr. | |
| 3,173,484 A | 3/1965 | Huitt et al. | |
| 3,195,635 A | 7/1965 | Fast | |
| 3,272,650 A | 9/1966 | MacVittie | |
| 3,302,719 A | 2/1967 | Fischer | |
| 3,364,995 A | 1/1968 | Atkins et al. | |

(Continued)

FOREIGN PATENT DOCUMENTS

EP  0 510 762  10/1992

(Continued)

OTHER PUBLICATIONS

Foreign communication from a related counterpart application dated Oct. 4, 2006.

(Continued)

*Primary Examiner*—William P Neuder
(74) *Attorney, Agent, or Firm*—Craig W. Roddy; Baker Botts, LLP

(57) ABSTRACT

Degradable kickoff plugs are provided. An example of a composition is a degradable kickoff plug that includes a degradable material; and an acid-base cement. Another example of a composition is a degradable kickoff plug formed by a method that includes: providing a self-degrading cement composition that includes a degradable material, an acid source, a base source, and a water source; placing the self-degrading cement composition in a desired location in a well bore that penetrates a subterranean formation; and allowing the self-degrading cement composition to set to form a hardened kickoff plug.

14 Claims, 13 Drawing Sheets

U.S. PATENT DOCUMENTS

| | | |
|---|---|---|
| 3,366,178 A | 1/1968 | Malone et al. |
| 3,368,623 A | 2/1968 | Carter et al. |
| 3,448,800 A | 6/1969 | Parker et al. ............... 166/294 |
| 3,455,390 A | 7/1969 | Gallus |
| 3,784,585 A | 1/1974 | Schmitt et al. ............. 260/861 |
| 3,819,525 A | 6/1974 | Hattenbrun |
| 3,828,854 A | 8/1974 | Templeton et al. .......... 166/307 |
| 3,836,465 A | 9/1974 | Rhudy et al. |
| 3,862,663 A | 1/1975 | Curtice et al. |
| 3,868,998 A | 3/1975 | Lybarger et al. ............ 166/278 |
| 3,912,692 A | 10/1975 | Casey et al. |
| 3,948,672 A | 4/1976 | Harnsberger |
| 3,955,993 A | 5/1976 | Curtice et al. |
| 3,960,736 A | 6/1976 | Free et al. ................ 252/8.55 R |
| 3,968,840 A | 7/1976 | Tate |
| 3,986,355 A | 10/1976 | Klaeger |
| 3,998,272 A | 12/1976 | Maly |
| 3,998,744 A | 12/1976 | Arnold et al. |
| 4,010,071 A | 3/1977 | Colegrove |
| 4,068,718 A | 1/1978 | Cooke, Jr. et al. |
| 4,083,407 A | 4/1978 | Griffin, Jr. et al. .......... 166/291 |
| 4,169,798 A | 10/1979 | DeMartino ............ 252/8.55 R |
| 4,172,066 A | 10/1979 | Zweigle et al. |
| 4,210,455 A | 7/1980 | Metcalf et al. |
| 4,261,421 A | 4/1981 | Watanabe |
| 4,265,673 A | 5/1981 | Pace et al. |
| 4,299,825 A | 11/1981 | Lee |
| 4,387,769 A | 6/1983 | Erbstoesser et al. |
| 4,460,052 A | 7/1984 | Gockel |
| 4,470,915 A | 9/1984 | Conway ................ 252/8.55 R |
| 4,498,995 A | 2/1985 | Gockel |
| 4,502,540 A | 3/1985 | Byham |
| 4,506,734 A | 3/1985 | Nolte |
| 4,521,316 A | 6/1985 | Sikorski |
| 4,526,695 A | 7/1985 | Erbstoesser et al. ..... 252/8.55 R |
| 4,632,876 A | 12/1986 | Laird et al. |
| 4,694,905 A | 9/1987 | Armbruster |
| 4,715,967 A | 12/1987 | Bellis et al. |
| 4,716,964 A | 1/1988 | Erbstoesser et al. ......... 166/284 |
| 4,767,706 A | 8/1988 | Levesque |
| 4,772,346 A | 9/1988 | Anderson et al. |
| 4,785,884 A | 11/1988 | Armbruster |
| 4,793,416 A | 12/1988 | Mitchell |
| 4,797,262 A | 1/1989 | Dewitz |
| 4,809,783 A | 3/1989 | Hollenbeck et al. ......... 166/307 |
| 4,817,721 A | 4/1989 | Pober |
| 4,822,500 A | 4/1989 | Dobson, Jr. et al. |
| 4,829,100 A | 5/1989 | Murphey et al. |
| 4,836,940 A | 6/1989 | Alexander |
| 4,843,118 A | 6/1989 | Lai et al. ................... 524/555 |
| 4,848,467 A | 7/1989 | Cantu et al. ................ 166/281 |
| 4,863,980 A | 9/1989 | Cowan et al. |
| 4,886,354 A | 12/1989 | Welch et al. |
| 4,894,231 A | 1/1990 | Moreau et al. |
| 4,957,165 A | 9/1990 | Cantu et al. |
| 4,961,466 A | 10/1990 | Himes et al. ............... 166/250 |
| 4,986,353 A | 1/1991 | Clark et al. ................ 166/279 |
| 4,986,354 A | 1/1991 | Cantu et al. ................ 166/279 |
| 4,986,355 A | 1/1991 | Cassad et al. |
| 5,034,139 A | 7/1991 | Reid et al. |
| 5,082,056 A | 1/1992 | Tackett, Jr. ................ 166/295 |
| 5,086,850 A | 2/1992 | Harris et al. |
| 5,142,023 A | 8/1992 | Gruber et al. ............... 528/354 |
| 5,151,203 A | 9/1992 | Riley et al. |
| 5,152,781 A | 10/1992 | Tang et al. |
| 5,161,615 A | 11/1992 | Hutchins et al. |
| 5,203,834 A | 4/1993 | Hutchins et al. |
| 5,213,446 A | 5/1993 | Dovan |
| 5,216,050 A | 6/1993 | Sinclair |
| 5,247,059 A | 9/1993 | Gruber et al. ............... 528/354 |
| 5,249,628 A | 10/1993 | Surjaatmadja |
| 5,251,697 A | 10/1993 | Shuler |
| 5,295,542 A | 3/1994 | Cole et al. |
| 5,298,069 A | 3/1994 | King et al. .................. 106/686 |
| 5,304,620 A | 4/1994 | Holtmyer et al. |
| 5,311,945 A | 5/1994 | Cowan et al. ............... 166/292 |
| 5,314,031 A | 5/1994 | Hale et al. ..................... 175/61 |
| 5,325,923 A | 7/1994 | Surjaatmadja et al. |
| 5,330,005 A | 7/1994 | Card et al. |
| 5,359,026 A | 10/1994 | Gruber ...................... 528/354 |
| 5,360,068 A | 11/1994 | Sprunt et al. |
| 5,363,916 A | 11/1994 | Himes et al. |
| 5,368,103 A | 11/1994 | Heathman et al. |
| 5,373,901 A | 12/1994 | Norman et al. |
| 5,386,874 A | 2/1995 | Laramay et al. |
| 5,396,957 A | 3/1995 | Surjaatmadja et al. |
| 5,402,846 A | 4/1995 | Jennings, Jr. et al. |
| 5,439,055 A | 8/1995 | Card et al. .................. 166/280 |
| 5,460,226 A | 10/1995 | Lawson et al. .............. 166/300 |
| 5,464,060 A | 11/1995 | Hale et al. |
| 5,475,080 A | 12/1995 | Gruber et al. ............... 528/354 |
| 5,484,881 A | 1/1996 | Gruber et al. ............... 528/354 |
| 5,487,897 A | 1/1996 | Polson et al. |
| 5,492,177 A | 2/1996 | Yeh et al. |
| 5,496,557 A | 3/1996 | Feijen et al. |
| 5,497,830 A | 3/1996 | Boles et al. |
| 5,499,678 A | 3/1996 | Surjaatmadja et al. |
| 5,501,276 A | 3/1996 | Weaver et al. |
| 5,505,787 A | 4/1996 | Yamaguchi |
| 5,512,071 A | 4/1996 | Yam et al. |
| 5,518,541 A | 5/1996 | Fogel et al. ................. 106/691 |
| 5,529,123 A | 6/1996 | Carpenter et al. |
| 5,536,807 A | 7/1996 | Gruber et al. ............... 528/354 |
| 5,555,936 A | 9/1996 | Pirri et al. |
| 5,566,757 A | 10/1996 | Carpenter et al. ........... 166/285 |
| 5,591,700 A | 1/1997 | Harris et al. ................ 507/204 |
| 5,594,095 A | 1/1997 | Gruber et al. ............... 528/354 |
| 5,602,083 A | 2/1997 | Gabrysch et al. |
| 5,604,186 A | 2/1997 | Hunt et al. .................. 507/204 |
| 5,607,905 A | 3/1997 | Dobson, Jr. et al. |
| 5,613,558 A | 3/1997 | Dillenbeck |
| 5,670,473 A | 9/1997 | Scepanski |
| 5,697,440 A | 12/1997 | Weaver et al. |
| 5,698,322 A | 12/1997 | Tsai et al. |
| 5,723,416 A | 3/1998 | Liao |
| 5,765,642 A | 6/1998 | Surjaatmadja |
| 5,783,527 A | 7/1998 | Dobson, Jr. et al. |
| 5,791,415 A | 8/1998 | Nguyen et al. |
| 5,799,734 A | 9/1998 | Norman et al. |
| 5,833,000 A | 11/1998 | Weaver et al. |
| 5,849,401 A | 12/1998 | El-Afandi et al. ........... 428/215 |
| 5,853,048 A | 12/1998 | Weaver et al. |
| 5,893,416 A | 4/1999 | Read |
| 5,908,073 A | 6/1999 | Nguyen et al. |
| 5,916,849 A | 6/1999 | House |
| 5,924,488 A | 7/1999 | Nguyen et al. |
| 5,964,291 A | 10/1999 | Bourne et al. |
| 5,977,030 A | 11/1999 | House |
| 5,979,557 A | 11/1999 | Card et al. |
| 5,996,693 A | 12/1999 | Heathman |
| 6,004,400 A | 12/1999 | Bishop et al. |
| 6,024,170 A | 2/2000 | McCabe et al. |
| 6,026,903 A | 2/2000 | Shy et al. |
| 6,028,113 A | 2/2000 | Scepanski |
| 6,047,772 A | 4/2000 | Weaver et al. |
| 6,073,694 A | 6/2000 | Crawshaw |
| 6,110,875 A | 8/2000 | Tjon-Joe-Pin et al. |
| 6,114,410 A | 9/2000 | Betzold |
| 6,123,159 A | 9/2000 | Brookey et al. |
| 6,123,965 A | 9/2000 | Jacob et al. |
| 6,131,661 A | 10/2000 | Conner et al. |
| 6,135,987 A | 10/2000 | Tsai et al. |
| 6,143,698 A | 11/2000 | Murphey et al. |
| 6,148,917 A | 11/2000 | Brookey et al. |

| | | | | | | |
|---|---|---|---|---|---|---|
| 6,162,766 | A | 12/2000 | Muir et al. ............... 507/267 | 6,981,552 B2 | 1/2006 | Reddy et al. |
| 6,169,058 | B1 | 1/2001 | Le et al. | 6,983,801 B2 | 1/2006 | Dawson et al. |
| 6,172,011 | B1 | 1/2001 | Card et al. | 6,987,083 B2 | 1/2006 | Phillippi et al. |
| 6,189,615 | B1 | 2/2001 | Sydansk ............... 166/270 | 6,997,259 B2 | 2/2006 | Nguyen |
| 6,202,751 | B1 | 3/2001 | Chatterji et al. | 7,000,701 B2 | 2/2006 | Todd et al. |
| 6,203,213 | B1 | 3/2001 | Singh et al. ............... 501/155 | 7,007,752 B2 | 3/2006 | Reddy et al. |
| 6,209,643 | B1 | 4/2001 | Nguyen et al. | 7,021,337 B2 | 4/2006 | Todd et al. |
| 6,209,646 | B1 | 4/2001 | Reddy et al. | 7,032,663 B2 * | 4/2006 | Nguyen ............... 166/276 |
| 6,214,773 | B1 | 4/2001 | Harris et al. | 7,036,586 B2 | 5/2006 | Roddy et al. |
| 6,242,390 | B1 | 6/2001 | Mitchell et al. ............... 507/211 | 7,036,587 B2 | 5/2006 | Munoz, Jr. et al. |
| 6,258,160 | B1 | 7/2001 | Chatterji et al. | 7,044,220 B2 | 5/2006 | Nguyen et al. |
| 6,260,622 | B1 | 7/2001 | Blok et al. | 7,044,224 B2 | 5/2006 | Nguyen |
| 6,291,013 | B1 | 9/2001 | Gibson et al. | 7,049,272 B2 | 5/2006 | Sinclair et al. |
| 6,300,286 | B1 | 10/2001 | Dobson, Jr. et al. | 7,063,151 B2 | 6/2006 | Nguyen et al. |
| 6,302,209 | B1 | 10/2001 | Thompson et al. | 7,066,258 B2 | 6/2006 | Justus et al. |
| 6,308,788 | B1 | 10/2001 | Patel et al. | 7,066,260 B2 | 6/2006 | Sullivan et al. |
| 6,311,773 | B1 | 11/2001 | Todd et al. | 7,069,994 B2 | 7/2006 | Cooke, Jr. |
| 6,323,307 | B1 | 11/2001 | Bigg et al. | 7,080,688 B2 | 7/2006 | Todd et al. |
| 6,326,458 | B1 | 12/2001 | Gruber et al. ............... 528/354 | 7,093,664 B2 | 8/2006 | Todd et al. |
| 6,328,105 | B1 | 12/2001 | Betzold | 7,096,947 B2 * | 8/2006 | Todd et al. ............... 166/283 |
| 6,330,917 | B2 | 12/2001 | Chatterji et al. | 7,101,829 B2 | 9/2006 | Guichard et al. |
| 6,357,527 | B1 | 3/2002 | Norman et al. | 7,131,491 B2 | 11/2006 | Blauch et al. |
| 6,364,945 | B1 | 4/2002 | Chatterji et al. | 7,132,389 B2 | 11/2006 | Lee |
| 6,380,138 | B1 | 4/2002 | Ischy et al. | 7,140,438 B2 | 11/2006 | Frost et al. |
| 6,387,986 | B1 | 5/2002 | Moradi-Araghi et al. .... 523/211 | 7,147,067 B2 | 12/2006 | Getzlaf et al. |
| 6,390,195 | B1 | 5/2002 | Nguyen et al. | 7,151,077 B2 | 12/2006 | Prud'homme et al. |
| 6,394,185 | B1 | 5/2002 | Constien | 7,153,902 B2 | 12/2006 | Altes et al. |
| 6,422,314 | B1 | 7/2002 | Todd et al. ............... 166/312 | 7,156,174 B2 | 1/2007 | Roddy et al. |
| 6,422,326 | B1 | 7/2002 | Brookey et al. | 7,165,617 B2 | 1/2007 | Lord et al. |
| 6,432,155 | B1 | 8/2002 | Swazey et al. | 7,166,560 B2 | 1/2007 | Still et al. |
| 6,454,003 | B1 | 9/2002 | Chang et al. | 7,168,489 B2 | 1/2007 | Frost et al. |
| 6,485,947 | B1 | 11/2002 | Rajgarhia et al. | 7,172,022 B2 | 2/2007 | Reddy et al. ............... 166/293 |
| 6,488,763 | B2 | 12/2002 | Brothers et al. | 7,178,596 B2 | 2/2007 | Blauch et al. |
| 6,494,263 | B2 | 12/2002 | Todd ............... 166/312 | 7,195,068 B2 | 3/2007 | Todd |
| 6,508,305 | B1 | 1/2003 | Brannon et al. ............... 166/293 | 7,204,312 B2 | 4/2007 | Roddy et al. |
| 6,509,301 | B1 | 1/2003 | Vollmer et al. | 7,205,264 B2 | 4/2007 | Boles |
| 6,527,051 | B1 | 3/2003 | Reddy et al. | 7,216,705 B2 | 5/2007 | Saini et al. |
| 6,554,071 | B1 | 4/2003 | Reddy et al. | 7,219,731 B2 | 5/2007 | Sullivan |
| 6,566,310 | B2 | 5/2003 | Chan | 7,228,904 B2 | 6/2007 | Todd et al. |
| 6,569,814 | B1 | 5/2003 | Brady et al. | 7,256,159 B2 | 8/2007 | Guichard et al. |
| 6,578,630 | B2 | 6/2003 | Simpson et al. | 7,261,156 B2 | 8/2007 | Nguyen et al. |
| 6,592,660 | B2 | 7/2003 | Nguyen et al. | 7,264,051 B2 | 9/2007 | Nguyen et al. |
| 6,599,863 | B1 | 7/2003 | Palmer et al. ............... 507/219 | 7,265,079 B2 | 9/2007 | Willberg et al. |
| 6,667,279 | B1 | 12/2003 | Hessert et al. | 7,267,170 B2 | 9/2007 | Mang et al. |
| 6,669,771 | B2 | 12/2003 | Tokiwa et al. ............... 106/162 | 7,276,466 B2 | 10/2007 | Todd et al. |
| 6,681,856 | B1 | 1/2004 | Chatterji et al. | 7,299,869 B2 | 11/2007 | Kalman |
| 6,686,328 | B1 | 2/2004 | Binder | 7,299,876 B2 | 11/2007 | Lord et al. |
| 6,691,780 | B2 | 2/2004 | Nguyen et al. | 7,303,014 B2 | 12/2007 | Reddy et al. |
| 6,702,023 | B1 | 3/2004 | Harris et al. | 7,306,037 B2 | 12/2007 | Nguyen et al. |
| 6,710,019 | B1 | 3/2004 | Sawdon et al. ............... 507/136 | 7,322,412 B2 | 1/2008 | Badalamenti et al. |
| 6,716,797 | B2 | 4/2004 | Brookey | 7,353,876 B2 | 4/2008 | Savery et al. |
| 6,737,385 | B2 | 5/2004 | Todd et al. | 7,353,879 B2 | 4/2008 | Todd et al. |
| 6,761,218 | B2 | 7/2004 | Nguyen et al. | 7,413,017 B2 | 8/2008 | Nguyen et al. |
| 6,763,888 | B1 | 7/2004 | Harris et al. | 7,448,450 B2 | 11/2008 | Luke et al. |
| 6,764,981 | B1 | 7/2004 | Eoff et al. | 7,455,112 B2 | 11/2008 | Moorehead et al. |
| 6,793,018 | B2 | 9/2004 | Dawson et al. | 7,461,697 B2 | 12/2008 | Todd et al. |
| 6,793,730 | B2 | 9/2004 | Reddy et al. | 7,475,728 B2 | 1/2009 | Pauls et al. |
| 6,806,235 | B1 | 10/2004 | Mueller et al. | 7,484,564 B2 | 2/2009 | Welton et al. |
| 6,817,414 | B2 | 11/2004 | Lee | 7,497,258 B2 | 3/2009 | Savery et al. |
| 6,818,594 | B1 | 11/2004 | Freeman et al. | 7,497,278 B2 | 3/2009 | Schriener et al. |
| 6,837,309 | B2 | 1/2005 | Boney et al. | 7,506,689 B2 | 3/2009 | Surjaatmadja et al. |
| 6,840,318 | B2 | 1/2005 | Lee et al. | 2001/0016562 A1 | 8/2001 | Muir et al. ............... 507/201 |
| 6,852,173 | B2 | 2/2005 | Banerjee et al. | 2001/0032022 A1 | 10/2001 | Ricci et al. |
| 6,861,394 | B2 | 3/2005 | Ballard et al. | 2002/0036088 A1 | 3/2002 | Todd |
| 6,883,608 | B2 | 4/2005 | Parlar et al. | 2002/0119169 A1 | 8/2002 | Angel et al. |
| 6,886,635 | B2 | 5/2005 | Hossaini et al. | 2002/0125012 A1 | 9/2002 | Dawson et al. |
| 6,896,058 | B2 | 5/2005 | Munoz, Jr. et al. | 2003/0054962 A1 | 3/2003 | England et al. |
| 6,904,971 | B2 | 6/2005 | Brothers et al. | 2003/0060374 A1 | 3/2003 | Cooke, Jr. ............... 507/200 |
| 6,908,506 | B2 * | 6/2005 | Zimmermann ............... 106/696 | 2003/0114314 A1 | 6/2003 | Ballard et al. ............... 507/100 |
| 6,949,491 | B2 | 9/2005 | Cooke, Jr. | 2003/0130133 A1 | 7/2003 | Vallmer ............... 507/100 |
| 6,959,767 | B2 | 11/2005 | Horton et al. | 2003/0147965 A1 | 8/2003 | Bassett et al. |
| 6,968,898 | B2 | 11/2005 | Todd et al. | 2003/0217847 A1 * | 11/2003 | Reddy et al. ............... 166/293 |
| 6,978,838 | B2 | 12/2005 | Parlar et al. | 2003/0230407 A1 | 12/2003 | Vijn et al. |

| | | |
|---|---|---|
| 2003/0234103 A1 | 12/2003 | Lee et al. .................... 166/293 |
| 2004/0014606 A1 | 1/2004 | Parlar et al. |
| 2004/0014607 A1 | 1/2004 | Sinclair et al. ............. 507/200 |
| 2004/0040706 A1 | 3/2004 | Hossaini et al. ............ 166/278 |
| 2004/0055747 A1 | 3/2004 | Lee .............................. 166/278 |
| 2004/0070093 A1 | 4/2004 | Mathiowitz et al. |
| 2004/0094300 A1 | 5/2004 | Sullivan et al. |
| 2004/0099416 A1 | 5/2004 | Vijn et al. |
| 2004/0106525 A1 | 6/2004 | Willberg et al. ............ 507/200 |
| 2004/0138068 A1 | 7/2004 | Rimmer et al. |
| 2004/0152601 A1 | 8/2004 | Still et al. ................... 507/100 |
| 2004/0152602 A1 | 8/2004 | Boles ......................... 507/100 |
| 2004/0170836 A1 | 9/2004 | Bond et al. |
| 2004/0231845 A1 | 11/2004 | Cooke, Jr. ................... 166/279 |
| 2004/0261993 A1 | 12/2004 | Nguyen et al. .............. 166/276 |
| 2004/0261996 A1 | 12/2004 | Munoz, Jr. et al. |
| 2005/0028976 A1 | 2/2005 | Nguyen |
| 2005/0034861 A1 | 2/2005 | Saini et al. |
| 2005/0059556 A1 | 3/2005 | Munoz, Jr. et al. |
| 2005/0059557 A1 | 3/2005 | Todd et al. .................. 507/110 |
| 2005/0059558 A1 | 3/2005 | Todd et al. |
| 2005/0126785 A1 | 6/2005 | Todd et al. |
| 2005/0130848 A1 | 6/2005 | Todd et al. |
| 2005/0167104 A1 | 8/2005 | Roddy et al. ................ 166/279 |
| 2005/0183741 A1 | 8/2005 | Surjaatmadja et al. |
| 2005/0205258 A1 | 9/2005 | Reddy et al. ................ 166/292 |
| 2005/0205266 A1 | 9/2005 | Todd et al. |
| 2005/0252659 A1 | 11/2005 | Sullivan et al. |
| 2005/0277554 A1 | 12/2005 | Blauch et al. |
| 2006/0016596 A1 | 1/2006 | Pauls et al. |
| 2006/0032633 A1 | 2/2006 | Nguyen |
| 2006/0042798 A1 | 3/2006 | Badalamenti et al. ....... 166/285 |
| 2006/0046938 A1 | 3/2006 | Harris et al. |
| 2006/0065397 A1 | 3/2006 | Nguyen et al. |
| 2006/0086503 A1 | 4/2006 | Reddy et al. ................ 166/293 |
| 2006/0105917 A1 | 5/2006 | Munoz, Jr. ................... 507/103 |
| 2006/0105918 A1 | 5/2006 | Munoz, Jr. et al. |
| 2006/0169182 A1 | 8/2006 | Todd et al. |
| 2006/0169448 A1 | 8/2006 | Savery et al. |
| 2006/0169449 A1 | 8/2006 | Mang et al. ................. 166/278 |
| 2006/0169450 A1 | 8/2006 | Mang et al. |
| 2006/0169452 A1 | 8/2006 | Savery et al. |
| 2006/0169453 A1 | 8/2006 | Savery et al. |
| 2006/0172891 A1 | 8/2006 | Todd et al. |
| 2006/0172893 A1 | 8/2006 | Todd et al. |
| 2006/0172894 A1 | 8/2006 | Mang et al. |
| 2006/0172895 A1 | 8/2006 | Mang et al. |
| 2006/0185848 A1 | 8/2006 | Surjaatmadja et al. |
| 2006/0205608 A1 | 9/2006 | Todd |
| 2006/0243449 A1 | 11/2006 | Welton et al. |
| 2006/0247135 A1 | 11/2006 | Welton et al. |
| 2006/0254774 A1 | 11/2006 | Saini et al. |
| 2006/0258543 A1 | 11/2006 | Saini |
| 2006/0258544 A1 | 11/2006 | Saini |
| 2006/0276345 A1 | 12/2006 | Todd et al. |
| 2007/0042912 A1 | 2/2007 | Welton et al. |
| 2007/0049501 A1 | 3/2007 | Saini et al. |
| 2007/0066492 A1 | 3/2007 | Funkhouser et al. |
| 2007/0066493 A1 | 3/2007 | Funkhouser et al. |
| 2007/0078063 A1 | 4/2007 | Munoz et al. |
| 2007/0078064 A1 | 4/2007 | Munoz et al. |
| 2007/0100029 A1 | 5/2007 | Reddy et al. ..................... 524/5 |
| 2007/0238623 A1 | 10/2007 | Saini et al. |
| 2007/0281868 A1 | 12/2007 | Pauls et al. |
| 2007/0298977 A1 | 12/2007 | Mang et al. |
| 2008/0009423 A1 | 1/2008 | Mang et al. |
| 2008/0026955 A1 | 1/2008 | Munoz et al. |
| 2008/0026959 A1 | 1/2008 | Munoz et al. |
| 2008/0026960 A1 | 1/2008 | Munoz et al. |
| 2008/0027157 A1 | 1/2008 | Munoz et al. |
| 2008/0070810 A1 | 3/2008 | Mang |
| 2008/0139415 A1 | 6/2008 | Todd et al. |
| 2008/0169102 A1 | 7/2008 | Carbajal et al. |
| 2009/0062157 A1 | 3/2009 | Munoz et al. |

FOREIGN PATENT DOCUMENTS

| | | |
|---|---|---|
| EP | 0 510 762 A1 | 3/1996 |
| EP | 0 879 935 | 11/1998 |
| EP | 1 413 710 | 4/2004 |
| GB | 2 412 389 | 3/2004 |
| JP | 2004181820 | * 12/2002 |
| WO | WO 93/15127 | 8/1993 |
| WO | WO 9315127 | 8/1993 |
| WO | WO 94/07949 | 4/1994 |
| WO | WO 94/08078 | 4/1994 |
| WO | WO 94/08090 | 4/1994 |
| WO | WO 9407949 | 4/1994 |
| WO | WO 9408078 | 4/1994 |
| WO | WO 9408090 | 4/1994 |
| WO | WO 95/09879 | 4/1995 |
| WO | WO 9509879 | 4/1995 |
| WO | WO 97/11845 | 4/1997 |
| WO | WO 9711845 | 4/1997 |
| WO | WO 99/27229 | 6/1999 |
| WO | WO 00/57022 | 9/2000 |
| WO | WO 01/02698 | 1/2001 |
| WO | WO 01/02698 A1 | 1/2001 |
| WO | WO 01/87797 A1 | 11/2001 |
| WO | WO 01/94744 | 12/2001 |
| WO | WO 02/55843 | 1/2002 |
| WO | WO 02/12674 A1 | 2/2002 |
| WO | WO 03/027431 | 4/2003 |
| WO | WO 03/027431 A3 | 4/2003 |
| WO | WO 2004/007905 | 1/2004 |
| WO | WO 2004/007905 A1 | 1/2004 |
| WO | WO 2004/037946 A1 | 5/2004 |
| WO | WO 2004/038176 A1 | 5/2004 |
| WO | WO 2005/000993 | 1/2005 |
| WO | WO 2007/010237 | 1/2007 |
| WO | WO 2007/010239 | 1/2007 |

OTHER PUBLICATIONS

Halliburton brochure entitled "Pozmix® A Cement Additive" dated 1999.

Halliburton brochure entitled "Silicalite Cement Additive" dated 1999.

Halliburton brochure entitled "VersaSet™ Cementing System" dated 1996.

Halliburton brochure entitled "VeraSet Thixotropic Additive" dated 1999.

Advances in Polymer Science, "Degradable Aliphatic Polyesters", vol. 157/2001, pp. 1-138.

BioMacromolecules, "Poly(ortho esters)-From Concept to Reality" Sep./Oct. 2004, vol. 5, No. 5.

Schwach-Abdellaoui, K. et al., "Hydrolysis and Erosion Studies of Autocatalyzed Poly(ortho esters) Containing Lactoyl-Lactyl Acid Dimers" dated 1999.

Ng, S.Y. et al., "Synthesis and Erosion Studies of Self-Catalyzed Poly(ortho ester)s" dated 1996.

Ng, S.Y. et al., "Development of a poly(ortho ester) prototype with a latent acid in the polymer backbone for 5-flourouracil delivery" dated 1999.

Rothen-Weinhold, A et al., "Release of BSA from poly(ortho ester) extruded thin strands" dated 2000.

Heller, et al., Poly(ortho ester)s—their development and some recent applications, European Journal of Pharmaceutics and Biopharmaceutics, 50, 2000, (pp. 121-128).

Heller, et al., Poly(ortho esters); synthesis, characterization, properties and uses, Advanced Drug Delivery Reviews, 54, 2002, (pp. 1015-1039).

Heller, et al., Poly(ortho esters) For The Pulsed and Continuous Delivery of Peptides And Proteins, Controlled Release and Biomedical Polymers Department, SRI International.

Zignani, et al., Subconjunctival biocompatibility of a viscous bioerodable poly(ortho ester), J. Biomed Mater Res, 39, 1998, pp. 277-285.

Toncheva, V. et al., "Use of Block copolymers of Poly(Ortho Esters) and Poly (Ethylene Glycol) Micellar Carriers as Potential Tumour Targeting Systems" dated 2003.

Schwach-Abdellaoui, K. et al., "Control of Molecular Weight for Auto-Catalyzed Poly(ortho ester) Obtained by Polycondensation Reaction" dated 2002.

Heller, J. et al., "Release of Norethindrone from Poly(Ortho Esters)*" dated 1981.

Cordes, E.H. et al., "Mechanism and Catalysis for Hydrolysis of Acetais, Ketais, and Ortho Esters" dated 1973.

Todd, Brad et al., "A Chemical "Trigger" Useful for Oilfield Applications" SPE 9279, dated 2005.

Skrabel, Anton, et al., "The hydrolysis rate of orthoformic acid ethyl ether" dated 1921.

U.S. Appl. No. 10/802,340, filed Mar. 17, 2004, Reddy et al.

U.S. Appl. No. 10/608,319, filed Jun. 27, 2003.

U.S. Appl. No. 10/608,373, filed Jun. 27, 2003.

Simmons, et al.,"Poly(phenyllactide): Synthesis, Characterization, and Hydrolytic Degradation," Biomacromolecules, vol. 2, No. 3 (pp. 658-663), 2001.

Yin, et al.,"Preparation and Characterization of Substituted Polylactides," Am. Chem. Soc., vol. 32, No. 23 (pp. 7711-7718), 1999.

Yin, et al.,"Synthesis and Properties of Polymers Derived form Substituted Lactic Acids," Am. Chem. Soc., Ch. 12 (pp. 147-159), 2001.

Dechy-Cabaret, et al., "Controlled Ring-Opening Polymerization of Lactide and Glycolide," Americam Chemical Society, Chemical Reviews, 2004.

Virun Vichaibun and Montri Chulavatnatol, "A New Assay for the Enzymatic Degradation of Polylactic Acid," ScienceAsia 29: 297-300, 2003.

Ceratech Inc., "PaveMend", Undated.

"Technology Transfer at Argonne; Commercialization and Licensing Opportunity; Chemically Bonded Ceramic," available at http://www.techtransfer.anl.gov/techtour/ceramicrete.html, Dec. 27, 2004.

Argonne National Laboratory, "Ceramicrete Provides Concrete Evidence of Superior Performance", Undated.

Civil Engineering Research Foundation, "New Materials and Technologies Available for Use in Industrial Infrastructure," 6, 2003.

Mark Anderson and Mike Riley, "PaveMend™ as a Solution for Rapid Runway Repair", Undated.

S. Y. Jeong and A. S. Wagh, "Chemically Bonded Phosphate Ceramics: Cementing the Gap Between Ceramics and Cements", Jun. 2002.

Alan D. Wilson and John W. Nicholson (Cambridge Univ. Press 1993), "Acid-Base Cements: Their Biomedical and Industrial Applications", 1993.

Foreign communication from a related counterpart application, Sep. 25, 2006.

Office Action from U.S. Appl. No. 11/188,280, Jun. 6, 2007.

Office Action dated Jun. 8, 2007 from U.S. Appl. No. 11/188,238.

Office Action from U.S. Appl. No. 11/188,238, Oct. 29, 2007.

Office Action from U.S. Appl. No. 11/188,280, Oct. 22, 2007.

Cantu, et al, *Laboratory and Field Evaluation of a Combined Fluid-Loss-Control Additive and Gel Breaker for Fracturing Fluids*, SPE 18211, Society of Petroleum Engineers, 1990.

Love, et al, *Selectively Placing Many Fractures in Openhole Horizontal Wells Improves Production*, SPE 50422, Society of Petroleum Engineers, 1998.

McDaniel, et al, *Evolving New Stimulation Process Proves Highly Effective in Level 1 Dual-Lateral Completion*, SPE 78697, Society of Petroleum Engineers, 2002.

Albertsson, et al, *Aliphatic Polyesters: Synthesis, Properties and Applications*, Advances in Polymer Science, vol. 157, Degradable Aliphatic Polyesters, 2002.

Funkhouser, et al, *Synthetic Polymer Fracturing Fluid for High-Temperature Applications*, SPE 80236, Society of Petroleum Engineers, 2003.

Halliburton, *SurgiFrac$^{SM}$ Service, A Quick and Cost-Effective Method to Help Boost Production From Openhole Horizontal Completions, Haliburton Communications*, HO3297, 2002.

Halliburton, *Cobra Frac$^{SM}$ Service, Coiled Tubing Fracturing—Cost-Effective Method for Stimulating Untapped Reserves*, HO2319R, Haliburton Energy Services, 2000.

Kiyoshi Matsuyama et al, Environmentally benign formation of polymeric microspheres by rapid expansion of supercritical carbon dioxide solution with a nonsolvent, Environ Sci Technol 2001, 35, 4149-4155.

Notice of allowance dated Nov. 13, 2007 from U.S. Appl. No. 11/048,272.

Office action dated Jul. 24, 2007 from U.S. Appl. No. 11/048,272.

Office action dated Jan. 31, 2007 from U.S. Appl. No. 11/048,272.

Office action dated Jan. 18, 2008 from U.S. Appl. No. 11/188,238.

Office action dated Jun. 8, 2007 from U.S. Appl. No. 11/188,238.

Office action dated Oct. 29, 2007 from U.S. Appl. No. 11/188,238.

Office action dated Jun. 6, 2007 from U.S. Appl. No. 11/188,280.

Office action dated Oct. 22, 2007 from U.S. Appl. No. 11/188,280.

Notice of Allowance from U.S. Appl. No. 11/188,280, Feb. 20, 2008.

Office Action mailed Jul. 2, 2008, from U.S. Appl. No. 11/188,238.

Chelating Agents, Encyclopedia of Chemical Technology, vol. 5 (764-795), 1995.

Halliburton, CobraJet FracSM Service, Cost-effective Technology That Can Help Reduce Cost Per BOE Produced, Shorten Cycle Time and Reduce Capex, Halliburton Communications, 2006.

Y. Chiang et al., Hydrolysis Of Ortho Esters; Further Investigation Of The Factors Which Control The Rate-Determining Step, Engineering Information, Inc. NY, NY, vol. 105, No. 23 (XP-002322842), 1983.

M. Ahmad, et al., Ortho Ester Hydrolysis: Direct Evidence For A Three-Stage Reaction Mechanism, Engineering Information, Inc. NY, NY, vol. 101, No. 10 (XP-002322843), 1979.

Office Action mailed Jul. 25, 2008 for U.S. Appl. No. 11/188,280.

Office Action mailed Oct. 23, 2008, for U.S. Appl. No. 11/048,591.

Office Action for U.S. Appl. No. 11/188,238, dated Dec. 3, 2008.

Notice of Allowance and Notice of Allowability from U.S. Appl. No. 11/188,280, dated Dec. 30, 2008.

NatureWorks Product Bulletin entitled NatureWorks PLA Polymer 3001D, Injection Molding Process Guide, 2005.

NatureWorks Product Bulletin entitled NatureWorks PLA Polymer 4060D, For Heat Seal Layer in Coextruded Oriented Films, 2005.

NatureWorks article entitled NatureWorks, Crystallizing and Drying of PLA, 2005.

Office Action for U.S. Appl. No. 11/188,238, dated Apr. 23, 2009.

* cited by examiner

KICKOFF PLUGS COMPRISING A SELF-DEGRADING CEMENT IN SUBTERRANEAN WELL BORES

CROSS-REFERENCE TO RELATED APPLICATIONS

This application is a continuation-in-part of U.S. patent application Ser. No. 11/048,272 and Ser. No. 11/048,591, both entitled "Self-Degrading Cement Compositions and Methods of Using Self-Degrading Cement Compositions in Subterranean Formations," both filed on Feb. 1, 2005, the entirety of which are herein incorporated by reference, and from which priority is claimed pursuant to 35 U.S.C. §120.

This application is also related to co-pending U.S. patent application Ser. No. 11/188,280, entitled "Methods of Isolating Zones in Subterranean formations using Self-Degrading Cement Compositions," and U.S. patent application Ser. No. 11/188,238, entitled "Methods of Directional Drilling and Forming Kickoff Plugs Using Self-Degrading Cement in Subterranean Well Bores," both filed on the same day herewith, the entirety of both of which is herein incorporated by reference.

BACKGROUND

The present invention relates to subterranean drilling operations. More particularly, the present invention relates to methods of drilling a well bore in a subterranean formation comprising placing a self-degrading kickoff plug or the like in the well bore.

During drilling of a well for production of oil, gas, or other fluids, it may be desirable to perform directional drilling, which may result in drilling of a deviated well bore. Directional drilling operations may be conducted for a variety of reasons, including, but not limited to, evading obstructions (e.g., drilling equipment that may have become stuck in the original well bore), drilling multiple wells from a single vertical well bore, or increasing production by increasing flow from adjacent subterranean formations.

Directional drilling operations may involve the setting of a kickoff plug, or the like, in a primary well bore. A kickoff plug may have a length ranging from about 50 to about 500 feet, and may comprise a cement composition. The kickoff plug typically is set in the well bore by lowering a drillstring or an open-ended tubing string to the desired depth and pumping a cement composition into the well bore. The cement composition may set to form a plug. After the cement plug has been formed, a drillstring may be used to reinitiate drilling operations. The drillstring and drill bit intentionally may be contacted with the plug, so as to thereby deflect the drill string and change the direction in which subsequent drilling proceeds.

The use of conventional kickoff plugs may be problematic, for a variety of reasons. Conventional kickoff plugs may be difficult to remove from the primary well bore, and may block the well bore and/or impair production of hydrocarbons from the subterranean formation. Even where removal of the kickoff plug from the well bore is possible, the removal procedure may require additional trips into the well bore, adding cost to the drilling operation. Furthermore, in cases in which a mechanical kickoff plug assembly is used, retrieving the kickoff plug by pulling it back up through the well bore may be problematic, because the well bore may lack sufficient space through which to pull the kickoff plug without damaging upper portions of the well bore and/or casing strings set therein.

Conventional approaches to solving these problems have included, inter alia, the use of a salt plug which, once used, can be dissolved by the introduction of an acidic solution into the well bore. However, significant drawbacks may be associated with this approach, including, but not limited to, environmental and occupational safety risks that may result from the use of large quantities of the acidic solution, the risk that a portion of the acidic solution may escape into other regions of the subterranean formation, and the delay of waiting for the acidic solution to dissolve the plug.

Another conventional approach involves drilling through the kickoff plug. However, this approach may require the use of other drilling equipment (e.g., drilling strings capable of producing a greater force, and a stabilizer assembly to keep the drill string from being deflected by the plug) that may further complicate the drilling operation and/or risk damage to the well bore.

SUMMARY

The present invention relates to subterranean drilling operations. More particularly, the present invention relates to methods of drilling a well bore in a subterranean formation comprising placing a self-degrading kickoff plug or the like in the well bore.

An example of a composition of the present invention is a degradable kickoff plug, comprising: a degradable material; and an acid-base cement.

Another example of a composition of the present invention is a degradable kickoff plug formed by a method comprising: providing a self-degrading cement composition that comprises a degradable material, an acid source, a base source, and a water source; placing the self-degrading cement composition in a desired location in a well bore that penetrates a subterranean formation; and allowing the self-degrading cement composition to set to form a hardened kickoff plug.

The features and advantages of the present invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
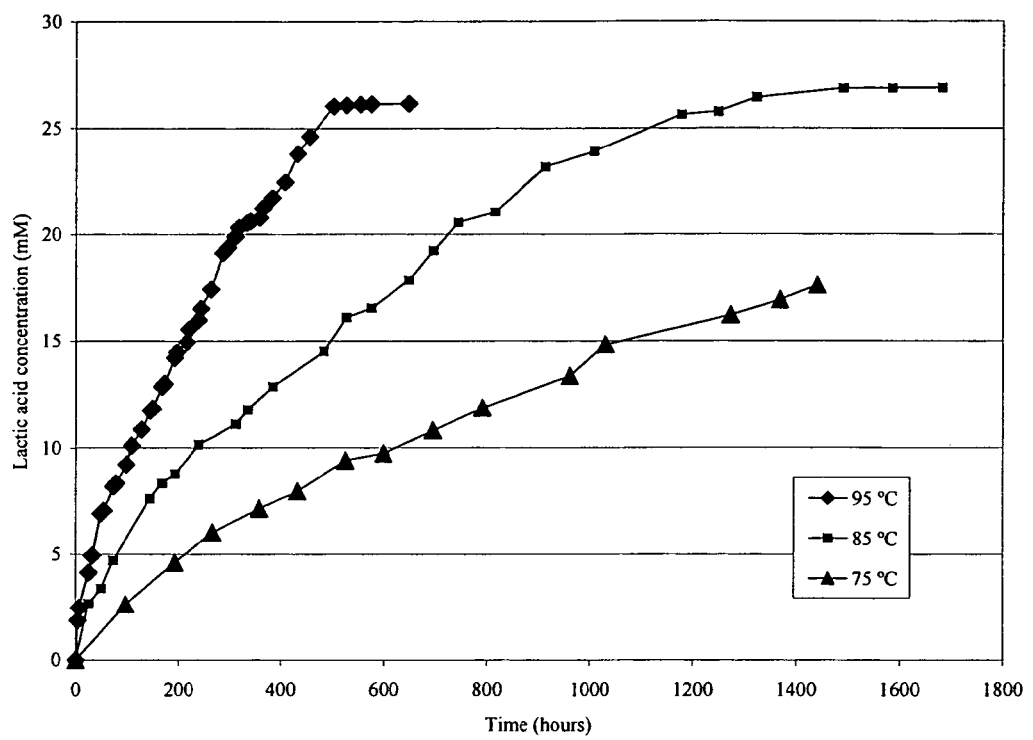
FIG. 1 illustrates the relationship of the time- and temperature-dependence of the degradation of a degradable material in one embodiment of the present invention.

The present invention relates to subterranean drilling operations. More particularly, the present invention relates to methods of drilling a well bore in a subterranean formation comprising placing a self-degrading kickoff plug or the like in the well bore.

1. Self-Degrading Cement Compositions

The self-degrading cement compositions utilized in the methods of the present invention generally comprise a degradable material, an acid source, a base source, and a water source. In certain embodiments of the present invention, the self-degrading cement composition initially will set to form a hardened mass that provides sufficient structural integrity to permit kickoff to occur, after which the degradable material may degrade either entirely, or partially. In certain embodiments in which the degradable material degrades only partially, such partial degradation may create voids within the hardened mass of the self-degrading cement composition that may permit fluid communication through the region of the well bore in which it is placed.

A broad variety of acid sources and base sources may be suitable for use in the self-degrading cement compositions utilized in the methods of the present invention. Examples of suitable acid sources include, inter alia, magnesium chloride ($MgCl_2$), potassium phosphate monobasic ($KH_2PO_4$), phosphoric acid ($H_3PO_4$), magnesium sulfate ($MgSO_4$), sodium phosphate monobasic ($NaH_2PO_4$), and ammonium phosphate monobasic ($NH_6PO_4$). Examples of suitable base sources include, inter alia, magnesium oxide (MgO), and ammonia ($NH_3$). An example of a suitable source of magnesium oxide is commercially available from Martin Marietta under the trade name "MagChem 10." An example of a suitable source of potassium phosphate monobasic is commercially available from Fisher Scientific.

Generally, an acid source and base source may be chosen that may react so as to form an acid-base cement. For example, magnesium oxide may be chosen as a base source, and potassium phosphate monobasic may be chosen as an acid source, so that in the presence of water they may react to produce an acid-base cement having the chemical formula $MgKPO_4.6H_2O$. As another example, magnesium oxide may be chosen as a base source, and magnesium chloride may be chosen as an acid source, so that in the presence of water they may react to produce an acid-base cement having three oxychloride phases; one oxychloride phase may have the chemical formula $5\,Mg(OH)_2MgCl_2.8H_2O$, which may be referred to as "5-form." As another example, magnesium oxide may be chosen as a base source, and phosphoric acid may be chosen as an acid source, so that in the presence of water they may react to produce an acid-base cement having the chemical formula $MgHPO_4.3H_2O$. As still another example, magnesium oxide may be chosen as a base source, and magnesium sulfate may be chosen as an acid source, so that in the presence of water they may react to produce an acid-base cement having four oxysulfate phases; one oxysulfate phase may have the chemical formula $3\,Mg(OH)_2MgSO_4.8H_2O$, which may be referred to as "3-form." As still another example, magnesium oxide may be chosen as a base source, and ammonium phosphate monobasic may be chosen as an acid source, so that in the presence of water they may react to produce an acid-base cement having the chemical formula $Mg(NH_4)PO_4.6H_2O$. A broad variety of acid sources and base sources may be used, and a broad variety of acid-base cements may be produced, in accordance with the present invention, including, but not limited to, those acid sources, base sources, and acid-base cements that are disclosed in "Acid-Base Cements: Their Biomedical and Industrial Applications," by Alan D. Wilson and John W. Nicholson (Cambridge Univ. Press, 1993).

Generally, the acid source and base source may be present in the self-degrading cement composition in a stoichiometric amount. For example, in certain embodiments of the present invention wherein magnesium oxide is used as a base source and potassium phosphate monobasic is used as an acid source, their relative concentrations may be illustrated by Equation 1 below:

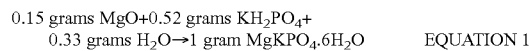

$$0.15 \text{ grams MgO} + 0.52 \text{ grams } KH_2PO_4 + 0.33 \text{ grams } H_2O \rightarrow 1 \text{ gram } MgKPO_4.6H_2O \quad \text{EQUATION 1}$$

Equation 1 is exemplary only, and may be modified as one of ordinary skill in the art will recognize, with the benefit of this disclosure. For example, additional quantities of magnesium oxide may be included, in amounts in the range of from about 1% excess by weight to about 25% excess by weight.

The self-degrading cement compositions utilized in the methods of the present invention generally comprise a water source. The water source may comprise fresh water, salt water (e.g., water containing one or more salts dissolved therein), brine (e.g., saturated salt water), or seawater. Generally, any water source may be used, provided that it does not contain an excess of compounds that may adversely affect other components in the self-degrading cement composition.

A broad variety of materials may be suitable as the degradable materials in the self-degrading cement compositions utilized in the methods of the present invention. In certain embodiments of the present invention, the degradable material may be a degradable polymer. The terms "degradation" or "degradable" refer to both the two relatively extreme cases of hydrolytic degradation that the degradable material may undergo, e.g., heterogeneous (or bulk erosion) and homogeneous (or surface erosion), and any stage of degradation in between these two. This degradation can be a result of, inter alia, a chemical or thermal reaction, or a reaction induced by radiation. The terms "polymer" or "polymers" as used herein do not imply any particular degree of polymerization; for instance, oligomers are encompassed within this definition.

A polymer is considered to be "degradable" herein if it is capable of undergoing an irreversible degradation when used in subterranean applications, e.g., in a well bore. The term "irreversible" as used herein means that the degradable material should degrade in situ (e.g., within a well bore) but should not recrystallize or reconsolidate in situ after degradation (e.g., in a well bore).

The degradability of a degradable polymer often depends, at least in part, on its backbone structure. For instance, the presence of hydrolyzable and/or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, e.g., temperature, presence of moisture, oxygen, microorganisms, enzymes, pH, and the like.

Suitable examples of degradable polymers that may be used in accordance with the present invention include, but are not limited to, those described in the publication of Advances in Polymer Science, Vol. 157 entitled "Degradable Aliphatic Polyesters," edited by A. C. Albertsson, pages 1-138. Specific examples include homopolymers, random, block, graft, and star- and hyper-branched aliphatic polyesters. Such suitable polymers may be prepared by polycondensation reactions, ring-opening polymerizations, free radical polymerizations, anionic polymerizations, carbocationic polymerizations, coordinative ring-opening polymerizations, as well as by any other suitable process. Examples of suitable degradable polymers that may be used in conjunction with the methods of this invention include, but are not limited to, aliphatic polyesters; poly(lactides); poly(glycolides); poly(ε-caprolactones); poly(hydroxy ester ethers); poly(hydroxybutyrates); poly(anhydrides); polycarbonates; poly(orthoesters); poly(amino acids); poly(ethylene oxides); poly(phosphazenes); poly ether esters, polyester amides, polyamides, and copolymers or blends of any of these degradable polymers, and derivatives of these degradable polymers. The term "copolymer" as used herein is not limited to the combination of two polymers, but includes any combination of polymers, e.g., terpolymers and the like. As referred to herein, the term "derivative" is defined herein to include any compound that is made from one of the listed compounds, for example, by replacing one atom in the base compound with another atom or group of atoms. Of these suitable polymers, aliphatic polyesters such as poly(lactic acid), poly(anhydrides), poly(orthoesters), and poly(lactide)-co-poly(glycolide) copolymers are preferred. Poly(lactic acid) is especially preferred. Poly(orthoesters) also may be preferred. Other degradable polymers that are subject to hydrolytic degradation also may be suitable. One's choice may depend on the particular application and the conditions involved. Other guidelines to consider include the degradation products that result, the time for required for the requisite degree of degradation, and the desired result of the degradation (e.g., voids).

Aliphatic polyesters degrade chemically, inter alia, by hydrolytic cleavage. Hydrolysis can be catalyzed by either acids or bases. Generally, during the hydrolysis, carboxylic end groups may be formed during chain scission, which may enhance the rate of further hydrolysis. This mechanism is known in the art as "autocatalysis," and is thought to make polyester matrices more bulk-eroding.

Suitable aliphatic polyesters have the general formula of repeating units shown below:

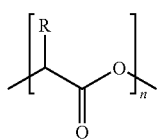

Formula I where n is an integer between 75 and 10,000 and R is selected from the group consisting of hydrogen, alkyl, aryl, alkylaryl, acetyl, heteroatoms, and mixtures thereof. In certain embodiments of the present invention wherein an aliphatic polyester is used, the aliphatic polyester may be poly(lactide). Poly(lactide) is synthesized either from lactic acid by a condensation reaction or, more commonly, by ring-opening polymerization of cyclic lactide monomer. Since both lactic acid and lactide can achieve the same repeating unit, the general term poly(lactic acid) as used herein refers to writ of formula I without any limitation as to how the polymer was made (e.g., from lactides, lactic acid, or oligomers), and without reference to the degree of polymerization or level of plasticization.

The lactide monomer exists generally in three different forms: two stereoisomers (L- and D-lactide) and racemic D,L-lactide (meso-lactide). The oligomers of lactic acid and the oligomers of lactide are defined by the formula:

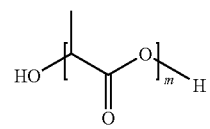

Formula II where m is an integer in the range of from greater than or equal to about 2 to less than or equal to about 75. In certain embodiments, m may be an integer in the range of from greater than or equal to about 2 to less than or equal to about 10. These limits may correspond to number average molecular weights below about 5,400 and below about 720, respectively. The chirality of the lactide units provides a means to adjust, inter alia, degradation rates, as well as physical and mechanical properties. Poly(L-lactide), for instance, is a semicrystalline polymer with a relatively slow hydrolysis rate. This could be desirable in applications of the present invention in which a slower degradation of the degradable material is desired. Poly(D,L-lactide) may be a more amorphous polymer with a resultant faster hydrolysis rate. This may be suitable for other applications in which a more rapid degradation may be appropriate. The stereoisomers of lactic acid may be used individually, or may be combined in accordance with the present invention. Additionally, they may be copolymerized with, for example, glycolide or other monomers like ε-caprolactone, 1,5-dioxepan-2-one, trimethylene carbonate, or other suitable monomers to obtain polymers with different properties or degradation times. Additionally, the lactic acid stereoisomers can be modified by blending high and low molecular weight polylactide or by blending polylactide with other polyesters. In embodiments wherein polylactide is used as the degradable material, certain preferred embodiments employ a mixture of the D and L stereoisomers, designed so as to provide a desired degradation time and/or rate. Examples of suitable sources of degradable material are poly(lactic acids) that are commercially available from Cargill Dow under the trade names "6250D" and "5639A."

Aliphatic polyesters useful in the present invention may be prepared by substantially any of the conventionally known manufacturing methods such as those described in U.S. Pat. Nos. 6,323,307; 5,216,050; 4,387,769; 3,912,692; and 2,703,316, the relevant disclosures of which are incorporated herein by reference.

Polyanhydrides are another type of degradable polymer that may be suitable for use in the present invention. Polyanhydride hydrolysis proceeds, inter alia, via free carboxylic acid chain-ends to yield carboxylic acids as final degradation products. Their erosion time can be varied over a broad range of changes in the polymer backbone. Examples of suitable polyanhydrides include poly(adipic anhydride), poly(suberic anhydride), poly(sebacic anhydride), and poly(dodecanedioic anhydride). Other suitable examples include, but are not limited to, poly(maleic anhydride) and poly(benzoic anhydride).

The physical properties of degradable polymers may depend on several factors including, but not limited to, the composition of the repeat units, flexibility of the chain, presence of polar groups, molecular mass, degree of branching, crystallinity, and orientation. For example, short chain branches may reduce the degree of crystallinity of polymers while long chain branches may lower the melt viscosity and may impart, inter alia, extensional viscosity with tension-stiffening behavior. The properties of the material utilized further may be tailored by blending, and copolymerizing it with another polymer, or by a change in the macromolecular architecture (e.g., hyper-branched polymers, star-shaped, or dendrimers, and the like). The properties of any such suitable degradable polymers (e.g., hydrophobicity, hydrophilicity, rate of degradation, and the like) can be tailored by introducing select functional groups along the polymer chains. For example, poly(phenyllactide) will degrade at about one-fifth of the rate of racemic poly(lactide) at a pH of 7.4 at 55° C. One of ordinary skill in the art, with the benefit of this disclosure, will be able to determine the appropriate functional groups to introduce to the polymer chains to achieve the desired physical properties of the degradable polymers.

Whichever degradable material is used in the present invention, the degradable material may have any shape, including, but not limited to, particles having the physical shape of platelets, shavings, flakes, ribbons, rods, strips, spheroids, toroids, pellets, tablets, or any other physical shape. In certain embodiments of the present invention, the degradable material used may comprise a mixture of fibers and spherical particles. One of ordinary skill in the art, with the benefit of this disclosure, will recognize the specific degradable material that may be used in accordance with the present invention, and the preferred size and shape for a given application.

In certain embodiments of the present invention, the degradable material used may comprise a self-degrading fiber that comprises an outer shell and a core liquid, wherein the outer shell comprises a degradable polymer and substantially retains the core liquid. In certain embodiments of the present invention, the outer shell may comprise a degradable polymer that is subject to hydrolytic degradation. The core liquid may comprise a liquid that is able to at least partially facilitate or catalyze the hydrolysis of the degradable polymer in the outer shell. Optionally, the self-degrading fiber may comprise a coating on the outer shell and/or a suitable additive within the core liquid, e.g., an additive chosen to interact with the degradable polymer, its degradation products, or the surrounding subterranean environment. In certain embodiments, the outer shell may be non-porous. Methods of making the self-degrading fibers described herein include any suitable method for forming hollow fibers. One such method involves extruding hollow fibers made from a desired degradable polymer, soaking the hollow fibers in a liquid that will be the core liquid, saturating the hollow fibers with the liquid, and drying the exterior of the outer core of the fibers in such a manner that the liquid is retained in the hollow fibers and becomes a core liquid. Another method involves extruding a spinning solution of a chosen degradable polymer from an annular slit of a double pipe orifice to form a sheath solution while simultaneously extruding a liquid through the inside pipe of the double pipe orifice, to form a core liquid within the hollow fibers. Another method involves using capillary action to place the core liquid in an already-formed suitable hollow fiber. Other suitable methods known in the art may be used as well.

In choosing the appropriate degradable material, one should consider the degradation products that will result, and choose a degradable material that will not yield degradation products that would adversely affect other operations or components utilized in that particular application. The choice of degradable material also may depend, at least in part, on the conditions of the well (e.g., well bore temperature). For instance, lactides have been found to be suitable for lower temperature wells, including those within the range of 60° F. to 150° F., and polylactides have been found to be suitable for well bore temperatures above this range.

In certain embodiments, the degradation of the degradable material could result in a final degradation product having the potential to affect the pH of the self-degrading cement compositions utilized in the methods of the present invention. For example, in certain embodiments wherein the degradable material is poly(lactic acid), the degradation of the poly(lactic acid) to produce lactic acid may alter the pH of the self-degrading cement composition. In certain embodiments, a buffer compound may be included within the self-degrading cement compositions utilized in the methods of the present invention in an amount sufficient to neutralize the final degradation product. Examples of suitable buffer compounds include, but are not limited to, calcium carbonate, magnesium oxide, ammonium acetate, and the like. One of ordinary skill in the art, with the benefit of this disclosure, will be able to identify the proper type and concentration of a buffer compound to include in the self-degrading cement composition for a particular application. An example of a suitable buffer compound comprises ammonium acetate and is commercially available from Halliburton Energy Services, Inc., under the trade name "BA-20."

Figure 2:
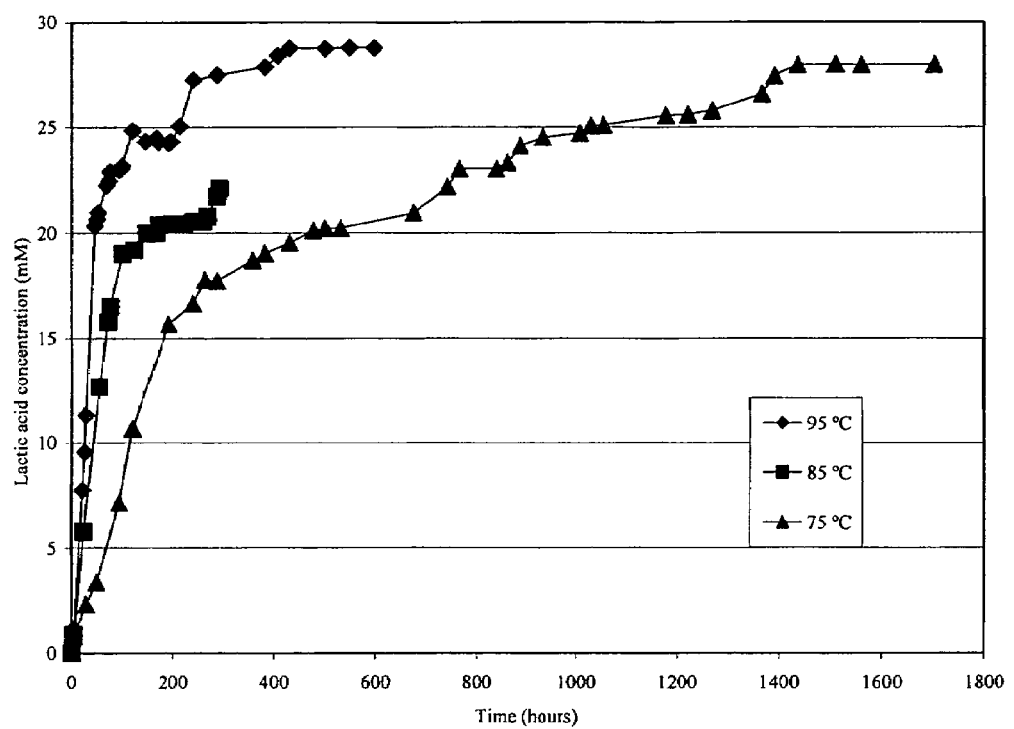
FIG. 2 illustrates the relationship of the time- and temperature-dependence of the degradation of a degradable material in another embodiment of the present invention.

The degradable materials utilized in the methods of the present invention may degrade over time at a rate that depends upon, among other things, the well bore temperature. Referring now to FIGS. 1 and 2, illustrated therein are graphical relationships of the time- and temperature-dependence of the degradation of certain degradable materials. The experiment in which these data were obtained was conducted as follows. A synthetic sea water solution was prepared by adding 41.953 grams of sea salt to one liter of deionized water. Next, 1.33 grams of sodium p-toluene sulfonate was added to the sea water solution to form a solution that was 6.919 mM in sodium p-toluene sulfonate. Next, one gram of a degradable material (6250D or 5639A) was placed in a one liter round-bottom flask containing 500 mL of synthetic sea water solution. A reflux condenser then was placed on each flask, and the contents were heated to 75, 85 or 95° C.

Using a disposable pipette, an aliquot was removed from each flask and placed in a 10 mL beaker. A carefully measured aliquot of 5.00 mL was removed and placed in a 50 mL round-bottom flask. The contents of the flasks were frozen by placing the flasks in liquid nitrogen. The flasks then were placed on a high vacuum line and the samples were allowed to dry overnight. After 24 hours, 1 mL of $D_2O$ was added to each flask, and the contents of the flask were stirred until the residue re-dissolved. The freeze drying was repeated to remove $D_2O$ and residual water. The remaining materials were dissolved in $D_2O$ for NMR measurement.

The $^1H$ NMR spectrum was collected using a Bruker 300 Avance NMR spectrometer operating at 300 MHz, using a 5 mm QNP probe at various time intervals. The integrated area of the methyl proton peak of lactic acid was compared to the integrated area of the 6.919 mM sodium p-toluene sulfonate internal standard, and the lactic acid concentration for each point displayed in FIGS. 1 and 2 was calculated from that ratio. FIG. 1 illustrates the time- and temperature-dependence of the generation of lactic acid caused by the degradation of 6250D, while FIG. 2 illustrates the time- and temperature-dependence of the generation of lactic acid caused by the degradation of 5639A.

For certain embodiments of the self-degrading cement compositions utilized in the methods of the present invention wherein poly(lactic acid) is used as the degradable material, Table 1 below demonstrates the relationship that may exist between the concentration of poly(lactic acid) in the self-degrading cement composition and the degree of void space that may result in the solid mass after the poly(lactic acid) is allowed to degrade.

TABLE 1

| Poly(lactic acid) concentration (volume percent of the cement composition) | Resulting void space |
|---|---|
| 8% | 20% |
| 11% | 30% |
| 13% | 40% |
| 15% | 50% |

Optionally, the self-degrading cement compositions utilized in the methods of the present invention may include a set retarder. Generally, any set retarder may be used with the self-degrading cement compositions utilized in the methods of the present invention. Examples of set retarders suitable for use in the self-degrading cement compositions utilized in the methods of the present invention include, but are not limited to, sodium citrate and sodium borate. An example of a suitable commercially-available set retarder is Component R, available from Halliburton Energy Services, Inc., of Duncan, Okla. Where included, the set retarder may be present in the self-degrading cement compositions utilized in the methods of the present invention in an amount in the range of from about 0.05% to about 10% by weight of the self-degrading cement composition. In certain embodiments, the set retarder may be present in the self-degrading cement compositions utilized in the methods of the present invention in an amount in the range of from about 0.1% to about 4% by weight of the self-degrading cement composition.

The self-degrading cement compositions utilized in the methods of the present invention optionally may include a strength-enhancing additive, which may act, among other things, to increase the stability of the set cement. Examples of these strength-enhancing additives include, but are not limited to, Newberyite, calcium carbonate, and Struvite. Where included, the strength-enhancing additive may be present in the self-degrading cement compositions utilized in the methods of the present invention in an amount in the range of from about 5% to about 60% by weight of the self-degrading cement composition. In certain embodiments, the strength-enhancing additive may be present in the self-degrading cement compositions utilized in the methods of the present invention in an amount in the range of from about 10% to about 30% by weight of the self-degrading cement composition.

Examples of other additional additives that may be added to the self-degrading cement compositions of the present invention include, among other things, fluid loss control additives, salts, vitrified shale, fly ash, fumed silica, bentonite, viscosifiers, suspending agents, dispersants, and the like. An example of a suitable fly ash is "POZMIX® A," commercially available from Halliburton Energy Services, Inc., of Duncan, Okla. An example of a suitable source of fumed silica is "SILICALITE™," commercially available from Halliburton Energy Services, Inc., of Duncan, Okla. An example of a suitable viscosifier is "VERSASET™," commercially available from Halliburton Energy Services, Inc., of Duncan, Okla. One skilled in the art, with the benefit of this disclosure, will be able to determine which additional additives are appropriate for a particular application of the methods of the present invention, as well as the amounts of those additives that should be used.

2. Methods of Forming and Using Kickoff Plugs

In one embodiment, the present invention provides a method of placing a degradable kickoff plug in a well bore in a subterranean formation. The well bore in which the degradable kickoff plug placed may be an open hole, a cased hole, or any combination thereof.

Figure 3:
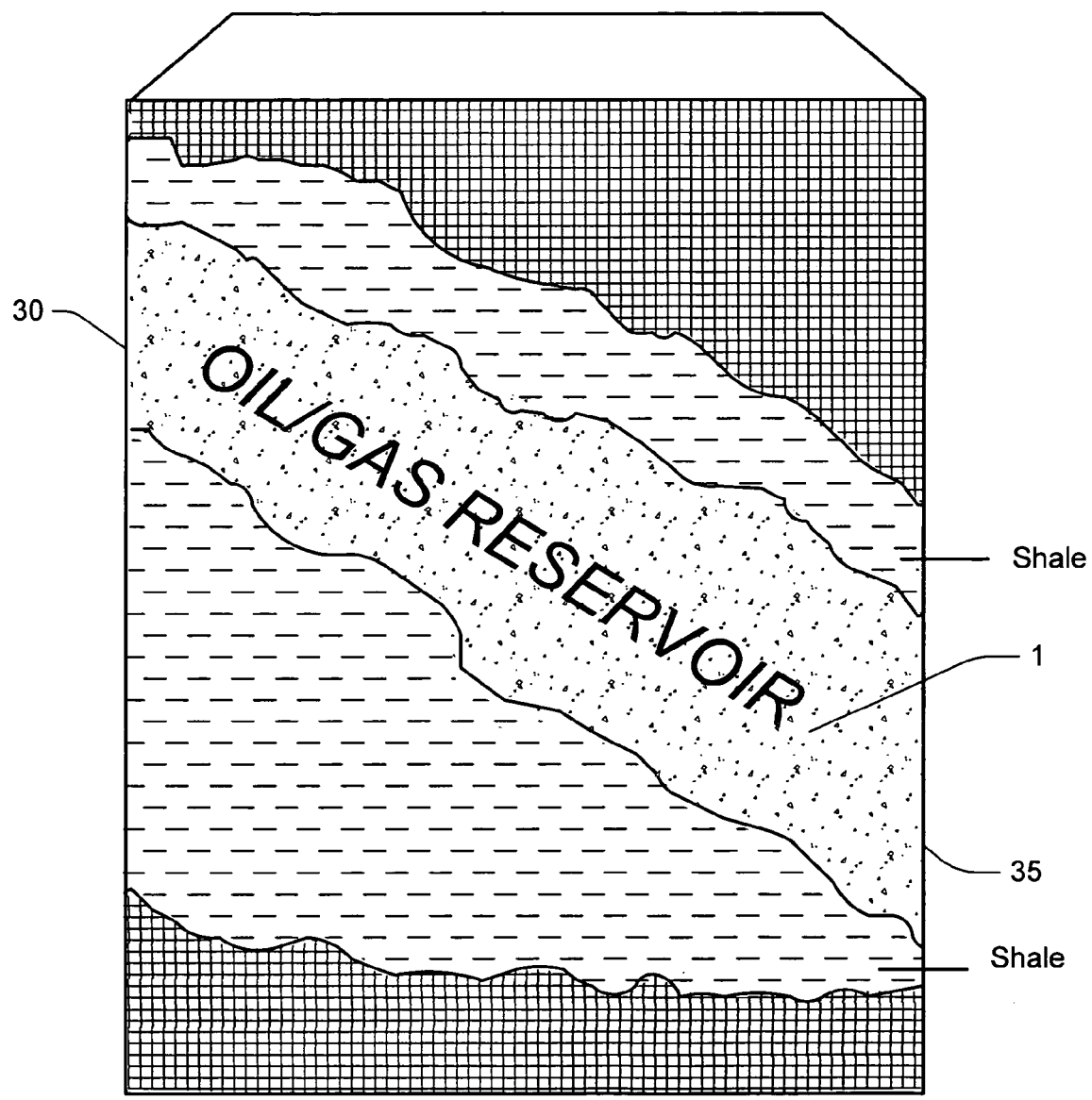
FIG. 3 illustrates an example of an oil/gas reservoir in a subterranean formation.

Referring now to FIG. 3, a cross-section of a subterranean formation is illustrated therein. In the formation illustrated in FIG. 3, a reservoir 1 (comprising hydrocarbons, e.g., oil and/or gas) is depicted, bounded above and below by shale zones. Reservoir 1 has an upper portion 30 and a lower portion 35.

Figure 4:
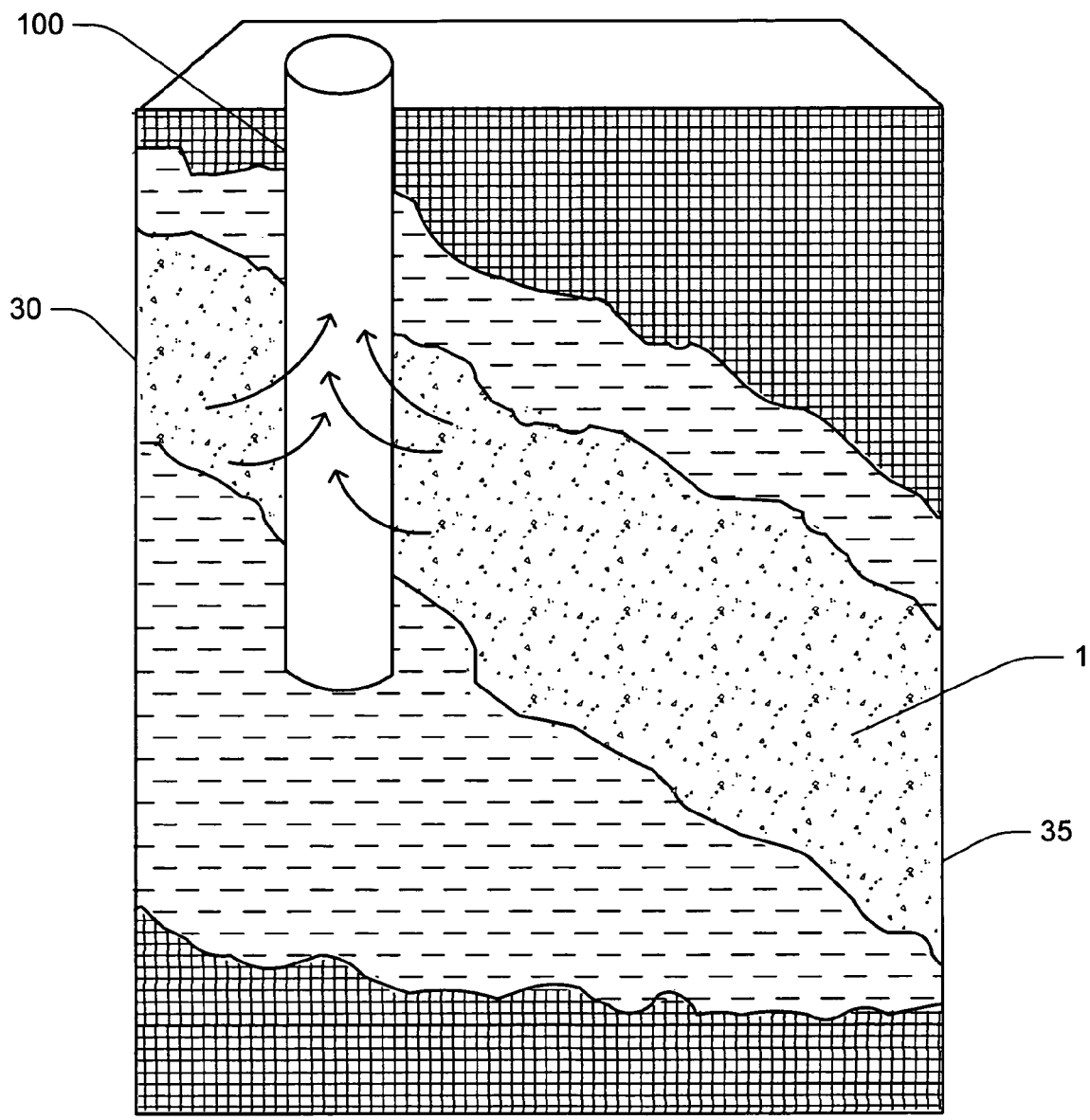
FIG. 4 illustrates an example of a well bore in the subterranean formation of FIG. 3.

Referring now to FIG. 4, a well bore 100 has been drilled within the formation. As shown in FIG. 4, production of hydrocarbons has been commenced, which gradually will cause upper portion 30 of reservoir 1 to be depleted over time; hydrocarbons will remain in lower portion 35 of reservoir 1.

Figure 5:
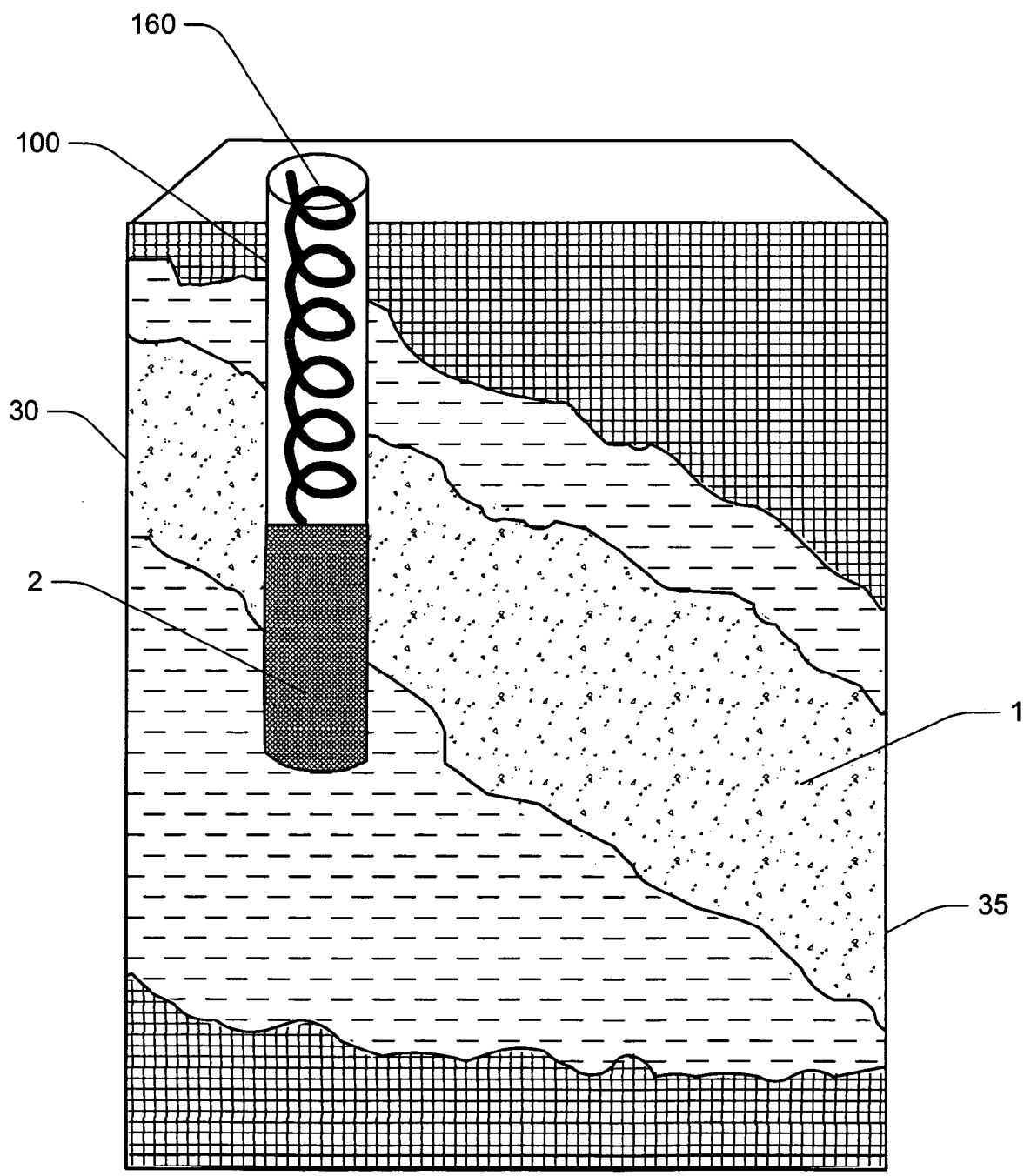
FIG. 5 illustrates the well bore of FIG. 4, having disposed therein an embodiment of a self-degrading cement composition of the present invention.

Referring now to FIG. 5, a self-degrading cement composition 2 is placed in well bore 100, via any suitable manner. In some embodiments, the self-degrading cement composition 2 may be pumped through the drillstring. In some embodiments, the self-degrading cement composition 2 may be pumped through an open-ended coiled tubing 160 to the desired location in well bore 100. One skilled in the art, with the benefit of this disclosure, will recognize the appropriate techniques and equipment for placing the self-degrading cement composition 2 in well bore 100 in a particular application. In some embodiments, the self-degrading cement composition 2 may be placed in well bore 100 just below the point at which a directional hole or well bore will be initiated.

After the placement of the self-degrading cement composition 2 within the subterranean formation, the water source within the self-degrading cement composition 2 may combine with the dry materials in the self-degrading cement composition 2 to form what may be referred to as a "hydrate," e.g., a solid compound comprising water molecules that may combine in a definite ratio. Furthermore, the water molecules within the hydrate may provide a hydrolysis source for the degradable material.

The amount of time required for the self-degrading cement composition 2 to set to form a hardened kickoff plug 150 may depend upon a variety of factors, including, but not limited to, the temperature in well bore 100, the desired size and/or strength of the kickoff plug 150, the formulation of the self-degrading cement composition 2, and/or the presence of a set retarder. One of ordinary skill in the art, with the benefit of this disclosure, will recognize the amount of time required for the self-degrading cement composition 2 to set. In some embodiments of the present invention, permitting the self-degrading cement composition 2 to set to form a hardened kickoff plug 150 may require waiting an amount of time in the range of from about 15 minutes to about 72 hours.

Figure 6:
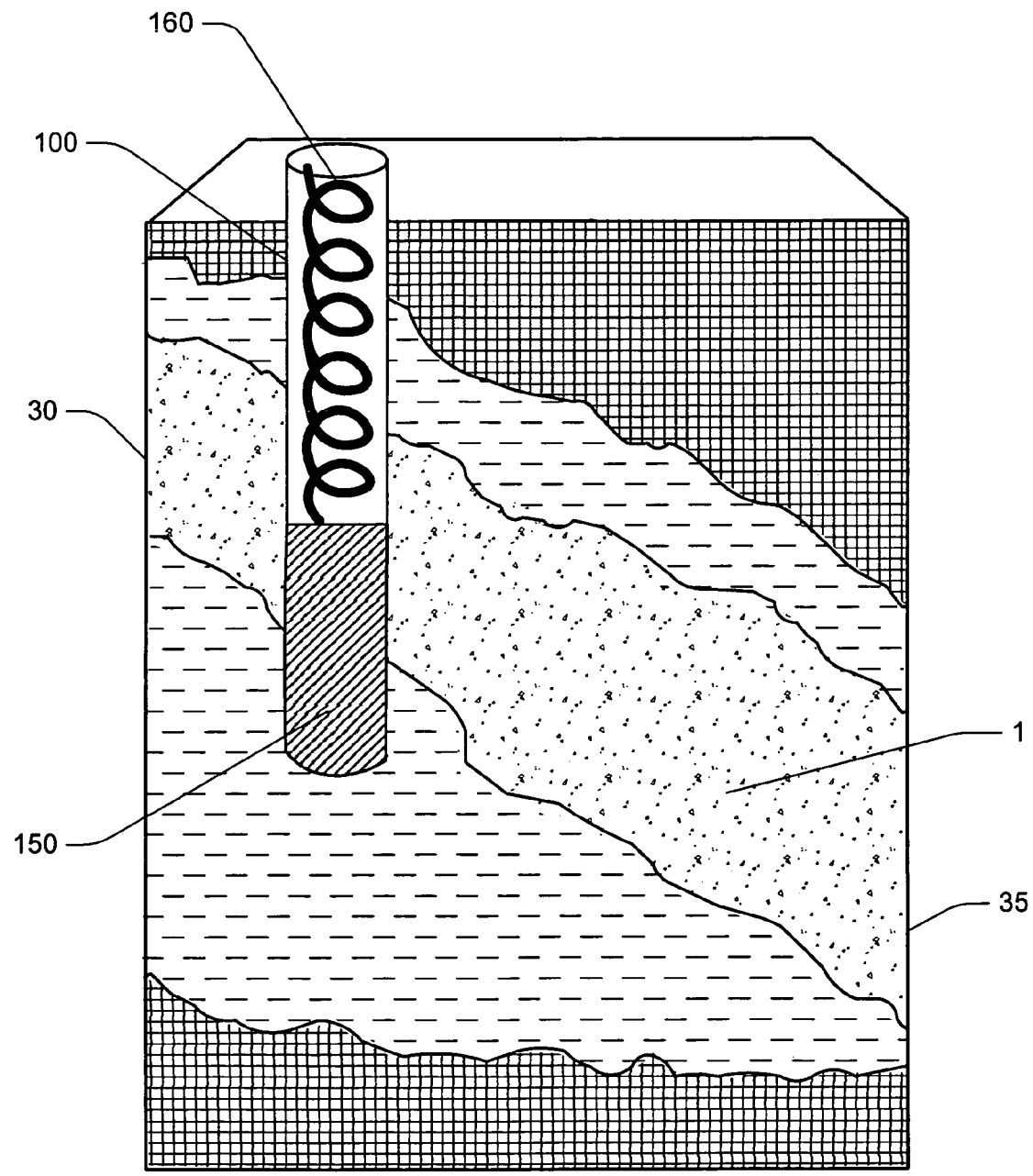
FIG. 6 illustrates the well bore of FIG. 5, in which the self-degrading cement composition has set to form a set cement.

Referring now to FIG. 6, the self-degrading cement composition placed within well bore 100 has set to form kickoff plug 150.

Figure 7:
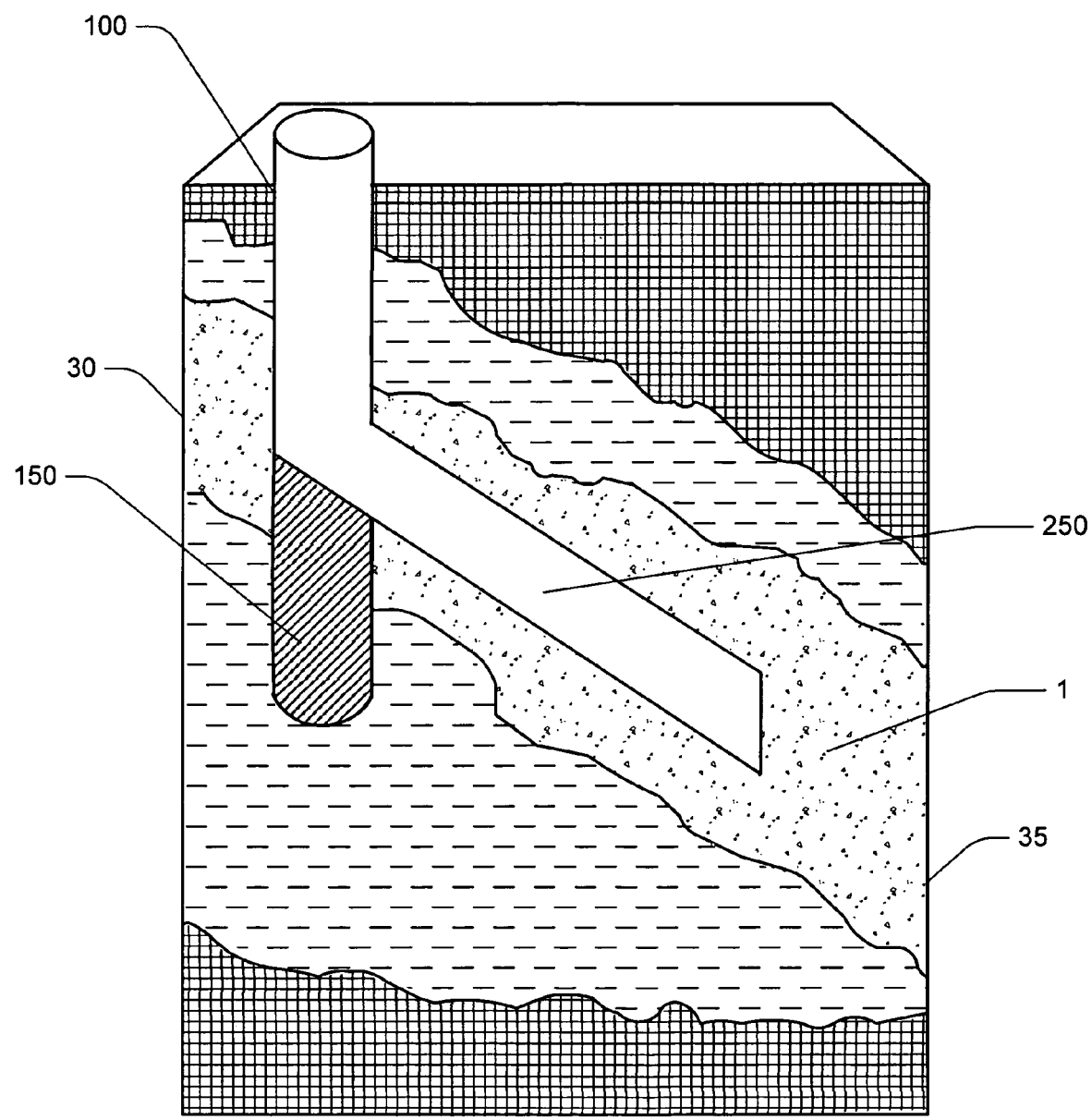
FIG. 7 illustrates the well bore of FIG. 6, in which a directional hole has been drilled.

In some embodiments, the methods of the present invention further may comprise contacting the hardened kickoff plug 150 with a drill string such that the path of the drill string deviates away from well bore 100 to a desired degree and allows the drill string to continue drilling a directional hole at a desired deviation from well bore 100. Referring now to FIG. 7, a directional hole 250 is shown, which permits fluid flow from lower reservoir 35 to well bore 100, and subsequently to the surface. In certain embodiments, the directional hole 250 may deviate away from well bore 100 by an amount in the range of from about 1 degree to about 20 degrees. The desired degree of deviation will depend upon a variety of factors, including, but not limited to, the location of recoverable fluids in the subterranean formation or an adjacent formation, the stability of the subterranean formation (e.g., the mechanical properties of the formation), the location of an obstruction around which the directional hole is constructed, and the like. One of ordinary skill in the art, with the benefit of this disclosure, will recognize the desired degree of deviation from well bore 100 for directional hole 250, and will be able to adapt the methods of the present invention to drill directional hole 250 at that desired deviation.

Figure 8:
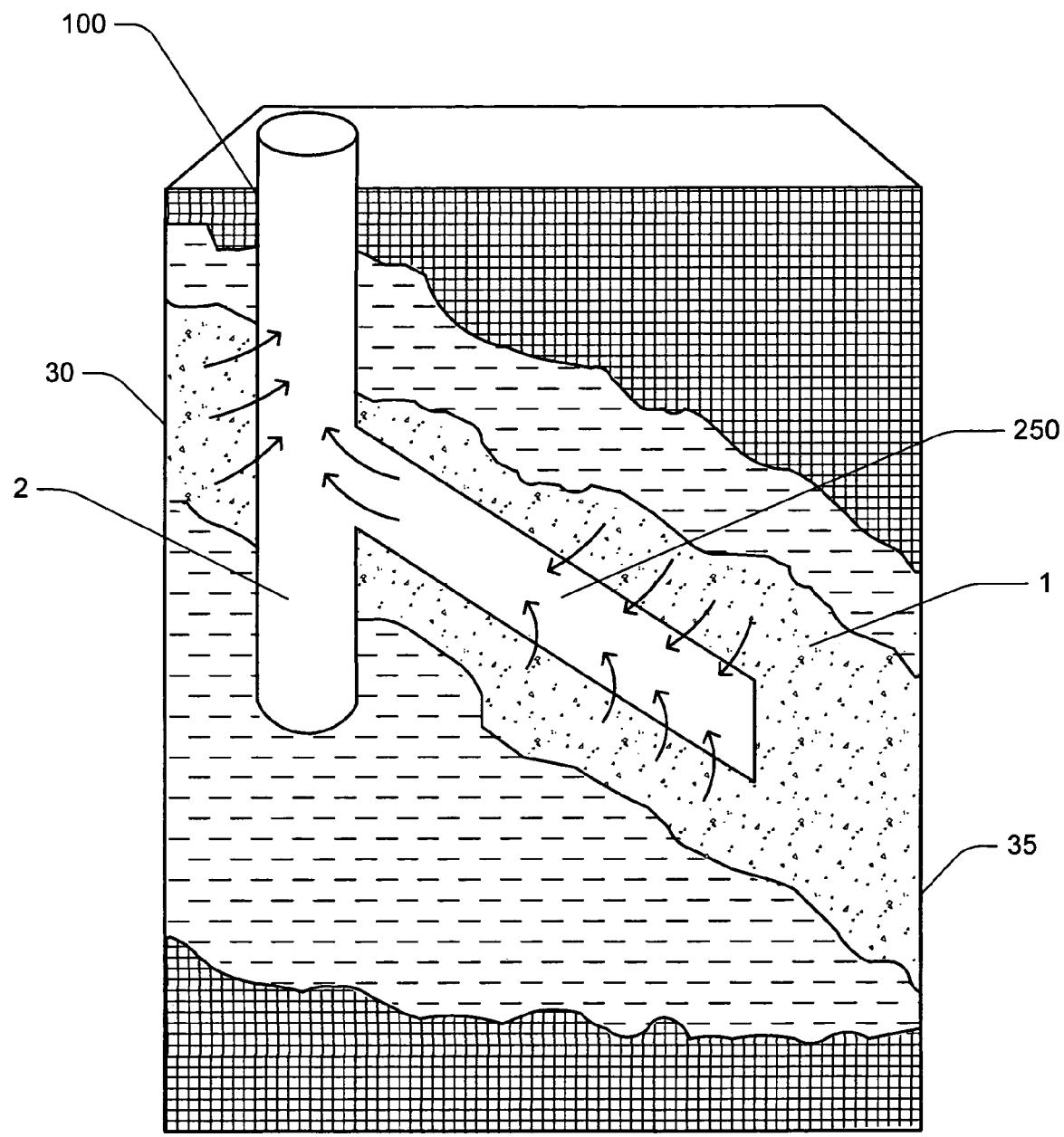
FIG. 8 illustrates the well bore of FIG. 7, in which the set cement has completely degraded, in accordance with an embodiment of the present invention.

Referring now to FIG. 8, hydrocarbon production has commenced from the lower reservoir 35. In some embodiments of the present invention, including those illustrated in FIG. 8, the hardened kickoff plug 150 may be allowed to degrade such that fluid communication through the portion of well bore 100 wherein kickoff plug 150 resides is at least partially restored; in preferred embodiments, kickoff plug 150 may degrade to such extent that fluid communication is completely restored. In some embodiments of the present invention, it may be desirable to allow the degradable material to degrade slowly over time, rather than instantaneously. In certain embodiments, allowing kickoff plug 150 to degrade such that fluid communication through the portion of well bore 100 wherein kickoff plug 150 resides is at least partially restored may require waiting an amount of time in the range of from about 4 hours to about 21 days. In certain embodiments, allowing kickoff plug 150 to degrade such that fluid communication through the portion of well bore 100 wherein kickoff plug 150 resides is at least partially restored may require waiting an amount of time in the range of from about 4 hours to about 36 hours. As illustrated in FIG. 8, enhanced hydrocarbon production is depicted, facilitated by the degradation of kickoff plug 150 and the drilling of directional hole 250.

Figure 9:
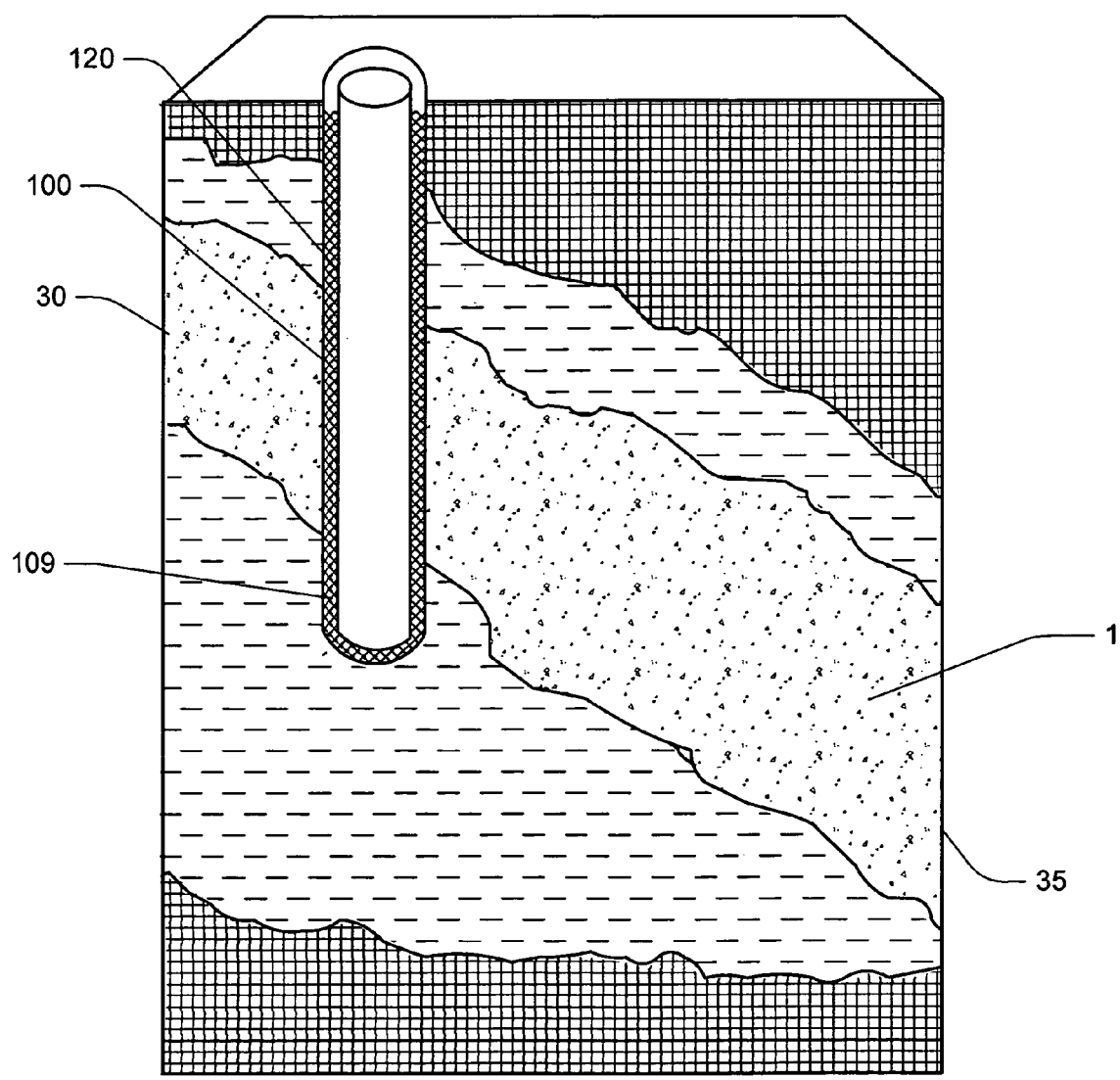
FIG. 9 illustrates an example of a well bore, having casing disposed therein, in the subterranean formation of FIG. 3.

Certain embodiments of the methods of the present invention may be used in well bores comprising casing. Referring now to FIG. 9, a cross-section of a subterranean formation is illustrated therein. In the formation illustrated in FIG. 9, a reservoir 1 (comprising hydrocarbons, e.g., oil and/or gas) is depicted, bounded above and below by shale zones. Reservoir 1 has an upper portion 30 and a lower portion 35. Well bore 100 has been drilled within the formation. Casing 120 is disposed within well bore 100. A conventional cement composition 109 has been placed in an annulus between the outer surface of casing 120 and the inner walls of well bore 100.

Figure 10:
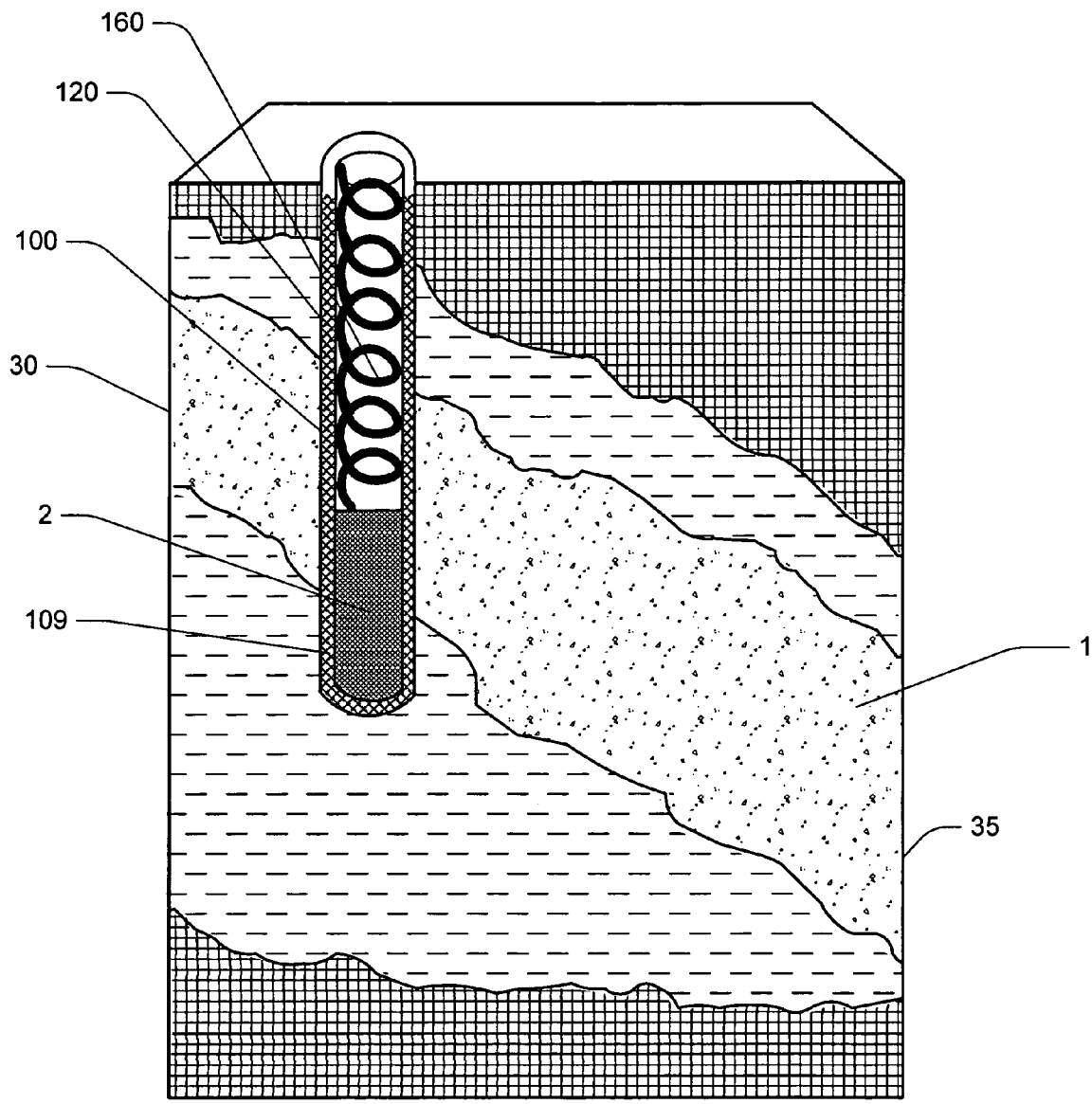
FIG. 10 illustrates the well bore of FIG. 9, having disposed therein an embodiment of a self-degrading cement composition of the present invention.

Referring now to FIG. 10, a self-degrading cement composition 2 is placed in well bore 100, via any suitable manner (e.g., by pumping through a drillstring, or, as shown in FIG. 10, by pumping through open-ended coiled tubing 160, or the like), as previously has been described herein.

Figure 11:
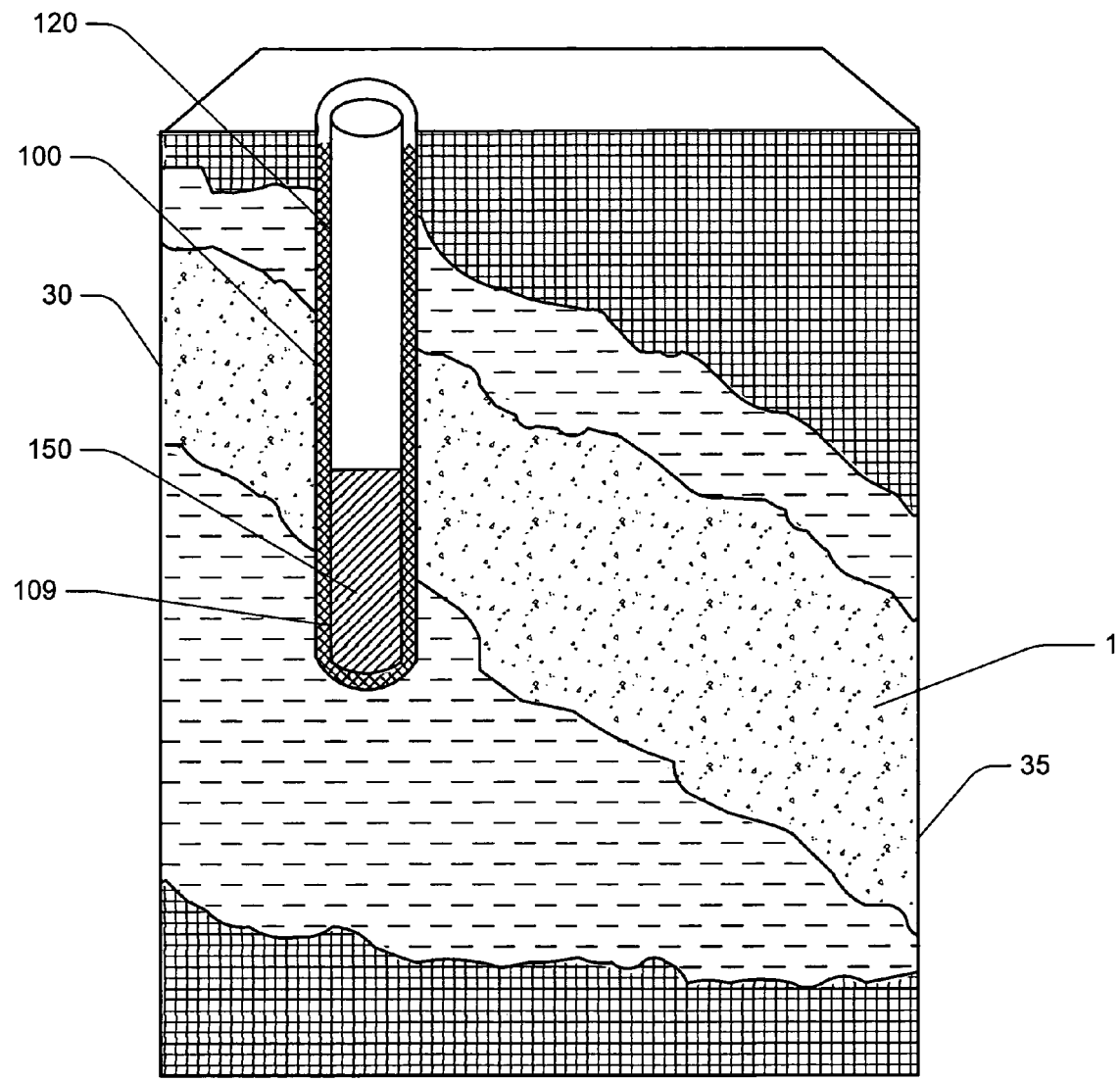
FIG. 11 illustrates the well bore of FIG. 10, in which the self-degrading cement composition has set to form a set cement.

Referring now to FIG. 11, the self-degrading cement composition 2 has set to form kickoff plug 150.

Figure 12:
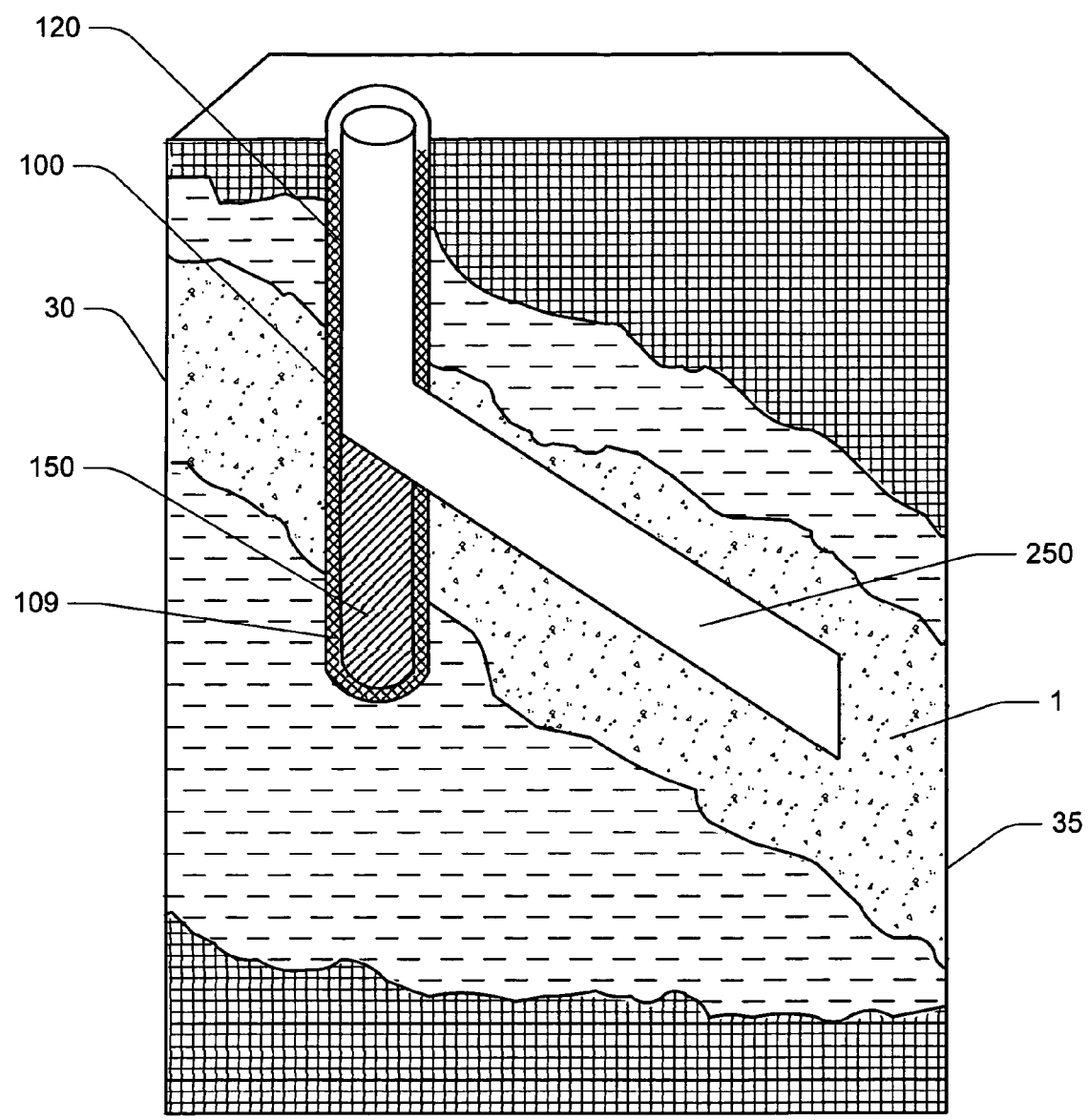
FIG. 12 illustrates the well bore of FIG. 11, in which a directional hole has been drilled.

Referring now to FIG. 12, illustrated therein is a directional hole 250 that permits fluid flow from lower reservoir 35 to well bore 100, and subsequently to the surface. Directional hole 250 may be provided, for example, by contacting the hardened kickoff plug 150 with a drill string (not shown in FIG. 12) such that the path of the drill string deviates away from well bore 100 to a desired degree, thereby permitting the drill string to continue drilling directional hole 250 at a desired deviation from well bore 100. The degree to which directional hole 250 may deviate away from well bore 100 previously has been described herein. In certain embodiments, once directional hole 250 has been drilled to a desired extent, a casing string 320 (not shown in FIG. 12) may be placed within directional hole 250, and perforations 330 (not shown in FIG. 12) may be created within casing string 320 (e.g., by use of a perforating tool, and the like). Subsequently, hydrocarbons (e.g., in the lower reservoir 35) may flow through perforations 330 (not shown in FIG. 12), into directional hole 250, and flow therefrom to the surface.

Figure 13:
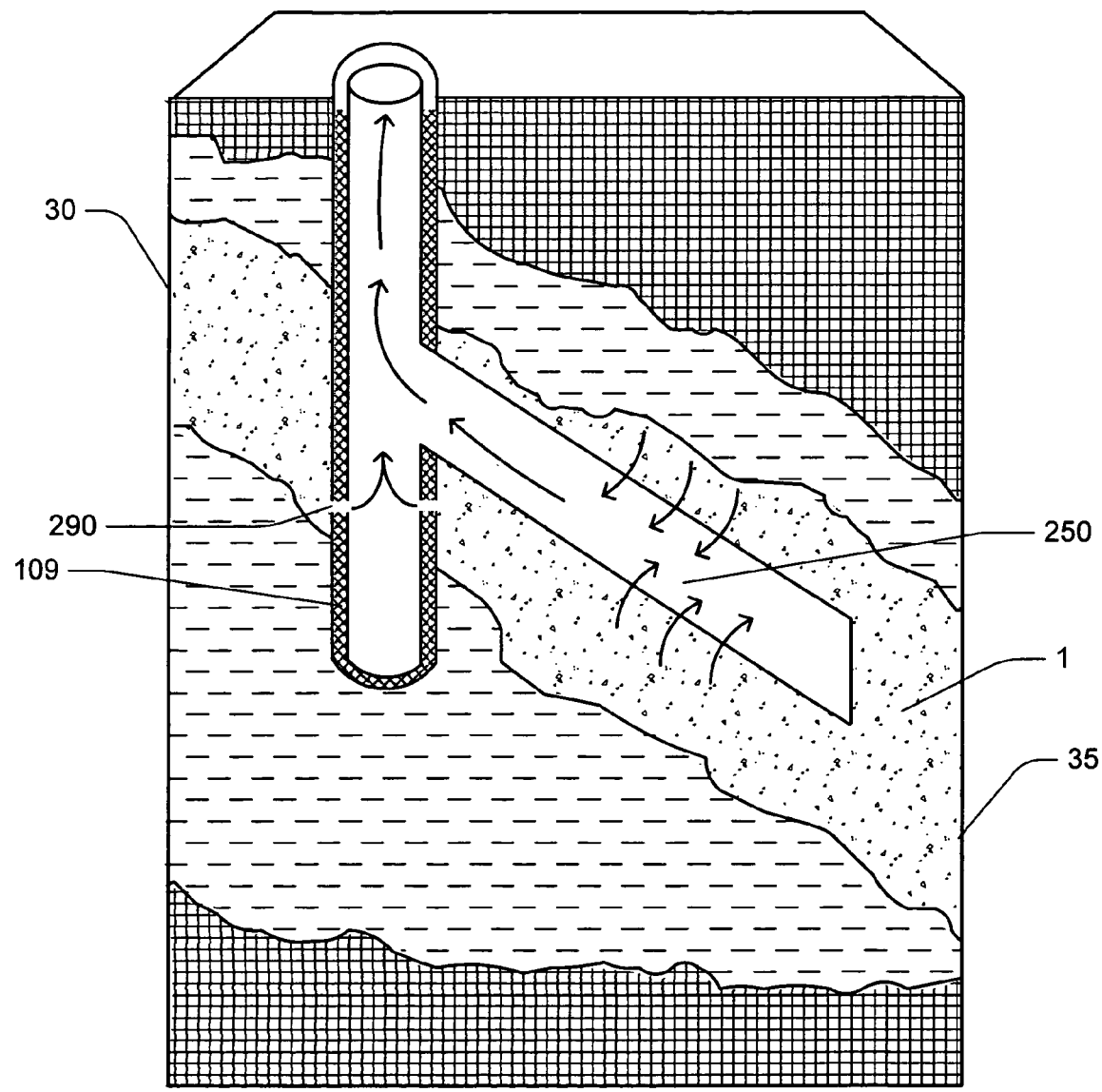
FIG. 13 illustrates the well bore of FIG. 12, in which the set cement has completely degraded, in accordance with an embodiment of the present invention.

Referring now to FIG. 13, enhanced hydrocarbon production is depicted, facilitated by the drilling of directional hole 250 and the degradation of kickoff plug 150. In some embodiments of the present invention, including those illustrated in FIG. 13, the hardened kickoff plug 150 may be allowed to degrade such that fluid communication through the portion of well bore 100 wherein kickoff plug 150 resides is at least partially restored; in preferred embodiments, kickoff plug 150 may degrade to such extent that fluid communication is completely restored. As illustrated in FIG. 13, the degradation of kickoff plug 150 facilitates entry of hydrocarbons into well bore 100 through perforations 290. In some embodiments of the present invention, it may be desirable to allow the degradable material to degrade slowly over time, rather than instantaneously.

To facilitate a better understanding of the present invention, the following examples of certain aspects of some embodiments are given. In no way should the following examples be read to limit, or to define, the scope of the invention.

EXAMPLE 1

Sample compositions were formed as follows. First, 7.58 grams of magnesium oxide were dry blended with 25.75 grams of potassium phosphate monobasic crystals ($KH_2PO_4$), and mixed with 16.67 grams of tap water. The mixture was stirred for some time, and poly(lactic acid) ("6250D") was added, generally in an amount in the range of from about 35% by weight to about 40% by weight. Certain of the sample compositions further comprised an acid-base cement referred to as Newberyite, and having the chemical formula $MgH(PO_4).3H_2O$. Among other things, Newberyite is thought to impart strength-enhancing properties to the sample composition, and the additional water that Newberyite may supply may facilitate hydrolysis of the degradable material (6250D, in this example). Table 2 sets forth the respective amounts of 6250D and Newberyite included in a particular sample composition.

TABLE 2

| Sample Composition | Poly(lactic acid) ("6250D") | Newberyite |
---|---|---
| 1 | 20 grams | Not added |
| 2 | 20 grams | Not added |
| 3 | 20 grams | 10 grams |
| 4 | 15 grams | 10 grams |
| 5 | 15 grams | Not added |
| 6 | 20 grams | 10 grams |
| 7 | 20 grams | Not added |
| 8 | 20 grams | 10 grams |

Each sample composition was placed in a 20 mL plastic cylinder, and was allowed to set therein a hard rod. Each rod then was left for a designated cure time at room temperature. Next, the set rod was taken out of the cylinder and either tested for compressibility or directly placed in a bomb supplied by PARR Instrument Company, Moline, Ill. Among other things, the bomb prevented the escape of water that may have been present in the set rod. The bomb was heated in a stove at 250° F. After a time (listed as "PARR Time" in Table 3 below), the bomb was removed from the stove, and its contents were observed to see whether or not degradation occurred.

Certain sample compositions were tested for compressibility using an apparatus supplied by Tinius Olsen Company of Willow Grove, Pa. The procedure was performed as follows. After the sample composition had cured and set into a hard rod, the rod was cut down to a 1 inch diameter and a 3 inch length. Two faces of the rod were smoothed. The rod then was placed under the Tinius Olsen compressibility load cell and subjected to a displacement load at a rate of 0.07 inches per minute. The maximum loading that each rod could withstand until failure was recorded.

The results of the testing are set forth in Table 3 below.

TABLE 3

| Sample Composition | Cure Time (75° F.) | Rod Compressive Strength (psi) | PARR Time (250° F.) | Degradation Comments |
|---|---|---|---|---|
| 1 | 24 hours | — | 24 hours | Flowable liquid with particulates about 1 mm in diameter. |
| 2 | 24 hours | 290 | 72 hours | Chunks (5-10 mm in diameter) with some liquid. |
| 3 | 24 hours | 1560 | 24 hours | Small chunks (1-3 mm with some liquid); very "sandy." |
| 4 | 24 days | 2040 | 24 hours | No self-degradation observed |
| 5 | 24 days | 510 | 48 hours | No self-degradation observed |
| 6 | 44 hours | 2470 (High) 490 (Low) | 72 hours | No self-degradation observed |
| 7 | 24 hours | 630 | 24 hours @ 180° F. 24 hours @ 250° F. | No self-degradation observed Large chunks (>1 cm in diameter) with some liquid. |
| 8 | 24 hours | 1180 | 24 hours @ 180° F. 24 hours @ 250° F. | No self-degradation observed Large chunks (>1 cm in diameter) with some liquid. |

Example 1 demonstrates, inter alia, that the combination of a degradable material and an acid-base cement may be suitable for use in the methods of the present invention.

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A degradable kickoff plug, comprising:
   a degradable material; and
   an acid-base cement that comprises at least one acid-base cement selected from the group consisting of: a compound corresponding to the chemical formula 5 $Mg(OH)_2MgCl_2.8H_2O$; a compound corresponding to the chemical formula $MgHPO_4.3H_2O$; a compound corresponding to the chemical formula 3 $Mg(OH)_2 MgSO_4.8H_2O$ any derivative thereof; and any combination thereof.

2. The degradable kickoff plug of claim 1, wherein the degradable material comprises at least one degradable material selected from the group consisting of: an aliphatic polyester; a polysaccharide; a poly(lactide); a poly(glycolide); a poly(ε-caprolactone); a protein; a poly(hydroxybutyrate); a poly(anhydride); an aliphatic polycarbonate; an ortho ester; poly(orthoester); a poly(vinylacetate); a poly(hydroxy ester ether); a poly(amino acid); a poly(ethylene oxide); chitin; chitosan; a polyphosphazene; a poly ether ester; a polyester amide; a polyamide; any derivative thereof; and any combination thereof.

3. The degradable kickoff plug of claim 1, wherein the degradable material comprises poly(lactic) acid.

4. The degradable kickoff plug of claim 1, wherein the acid-base cement further comprises a compound corresponding to the chemical formula $MgKPO_4.6H_2O$ or a derivative thereof.

5. The degradable kickoff plug of claim 1, wherein the acid-base cement comprises a compound corresponding to the chemical formula 5 $Mg(OH)_2.8H_2O$ or a derivative thereof.

6. The degradable kickoff plug of claim 1, wherein the acid-base cement comprises a compound corresponding to the chemical formula $MgHPO_4.3H_2O$ or a derivative thereof.

7. The degradable kickoff plug of claim 1, wherein the acid-base cement comprises a compound corresponding to the chemical formula 3 $Mg(OH)_2MgSO_4.8H_2O$ or a derivative thereof.

8. The degradable kickoff plug of claim 1, wherein the acid-base cement furthur comprises a compound corresponding to the chemical formula $Mg(NH_4)PO_4.6H_2O$ or a derivative thereof.

9. The degradable kickoff plug of claim 1, wherein the degradeable material comprises an ortho ester.

10. The degradable kickoff plug of claim 1, wherein the degradable material comprises a poly(orthoester).

11. A degradable kickoff plug formed by a method comprising:
   providing a self-degrading cement composition that comprises
      a degradable material comprising at least one degradeable material selected from the group consisting of poly(lactic) acid, an orthoester, a poly(orthoester), any derivative thereof, and any combination thereof,
      an acid source comprising at least one acid source selected from the group consisting of magnesium chloride; potassium phosphate monobasic; phosphoric acid; magnesium sulfate; ammonium phosphate monobasic; any derivative thereof, and any combination thereof,
      a base source comprising magnesium oxide, and
      a water source;
   placing the self-degrading cement composition in a desired location in a well bore that penetrates a subterranean formation; and
   allowing the self-degrading cement composition to set to form a hardened kickoff plug.

12. The degradable kickoff plug of claim 11 wherein the degradable material further comprises at least one degradable material selected from the group consisting of: an aliphatic polyester; a polysaccharide; a poly(lactide); a poly(glycolide); a poly(ε-caprolactone); a protein; a poly(hydroxybutyrate); a poly(anhydride); an aliphatic polycarbonate; a poly(vinylacetate); a poly(hydroxy ester ether); a poly(amino acid); a poly(ethylene oxide); chitin; chitosan; a polyphosphazene; a poly ether ester; a polyester amide; a polyamide; any derivative thereof; and any combination thereof.

13. The degradable kickoff plug of claim 11 wherein the degradable material comprises poly(lactic) acid.

14. The degradable kickoff plug of claim 11 wherein the degradable material comprises a self-degrading fiber that comprises an outer shell and a core liquid, wherein the outer shell comprises a degradable polymer and substantially retains the core liquid.

* * * * *

UNITED STATES PATENT AND TRADEMARK OFFICE
CERTIFICATE OF CORRECTION

PATENT NO. : 7,637,319 B2  
APPLICATION NO. : 11/188262  
DATED : December 29, 2009  
INVENTOR(S) : Savery et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 641 days.

Signed and Sealed this

Ninth Day of November, 2010

David J. Kappos  
*Director of the United States Patent and Trademark Office*